(12) United States Patent
    Wollmann et al.

(10) Patent No.: US 12,638,688 B2
(45) Date of Patent: *May 26, 2026

(54) LASER REMOTE VIEWING AND OPERATING ROOM INTERACTIVE AUDIOVISUAL SYSTEM

(71) Applicant: Caresyntax GmbH, Berlin (DE)

(72) Inventors: Alexander Georg Wollmann, Berlin (DE); Dirk Asmus, Berlin (DE); Vik Anantha, Portland, OR (US)

(73) Assignee: Caresyntax GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/972,479

(22) Filed: Dec. 6, 2024

(65) Prior Publication Data

US 2025/0102820 A1 Mar. 27, 2025

Related U.S. Application Data

(60) Division of application No. 18/355,123, filed on Jul. 19, 2023, now Pat. No. 12,196,978, which is a continuation of application No. 17/982,228, filed on Nov. 7, 2022, now Pat. No. 11,747,638.

(60) Provisional application No. 63/276,402, filed on Nov. 5, 2021.

(51) Int. Cl.
    *G02B 27/20* (2006.01)
(52) U.S. Cl.
    CPC .................................. *G02B 27/20* (2013.01)
(58) Field of Classification Search
    CPC ......... A61B 90/13; A61B 90/35; A61B 90/50; F41G 1/38; G02B 23/16; H01S 5/02315
    See application file for complete search history.

(56) References Cited

U.S. PATENT DOCUMENTS

| | | | |
|---|---|---|---|
| 4,712,444 A | * | 12/1987 | Lewis .................... G02B 7/004 108/4 |
| 6,198,580 B1 | | 3/2001 | Dallakian |
| 7,859,655 B2 | | 12/2010 | Troy et al. |
| 8,245,434 B2 | | 8/2012 | Hogg et al. |
| 8,531,562 B2 | | 9/2013 | Schmidt et al. |
| 8,897,920 B2 | | 11/2014 | Wang et al. |
| 11,747,638 B2 | | 9/2023 | Wollmann |
| 2013/0133239 A1 | | 5/2013 | Bowman |

(Continued)

OTHER PUBLICATIONS

International Search Report and Written Opinion mailed Mar. 21, 2023, in the International Application No. PCT/US22/49005. 16 pages.

*Primary Examiner* — Jason M Han
(74) *Attorney, Agent, or Firm* — Wilmer Cutler Pickering Hale and Dorr LLP

(57) ABSTRACT

A laser mount for fixedly coupling a laser pointer includes: a first layer; a second layer including a first end and a second end, a connection between the first layer and the first end forming a spring-tensioned hinge, such that deflection of the second end about the connection imparts a spring tension to the second layer, and the second end being spaced apart from the first layer; a first adjustment screw configured to vertically couple the first layer and the second end and to adjust a vertical spring tension between the first layer and the second layer; and a second adjustment screw configured to horizontally couple the first layer and the second end and to adjust a horizontal spring tension between the first layer and the second layer.

9 Claims, 19 Drawing Sheets

(56) References Cited

U.S. PATENT DOCUMENTS

2016/0231530 A1    8/2016  Liermann et al.
2016/0349481 A1   12/2016  D'Alessio et al.

* cited by examiner

LASER REMOTE VIEWING AND OPERATING ROOM INTERACTIVE AUDIOVISUAL SYSTEM

CROSS REFERENCE TO RELATED APPLICATION(S)

This application is a divisional of U.S. patent application Ser. No. 18/355,123, filed on Jul. 19, 2023, which is a continuation of U.S. patent application Ser. No. 17/982,228, filed on Nov. 7, 2022, and issued as U.S. Pat. No. 11,747,638 on Sep. 5, 2023, which claims the benefit of priority to U.S. Provisional Patent Application No. 63/276,402, filed on Nov. 5, 2021, the content of each of these applications is incorporated herein by reference in its entirety.

TECHNICAL FIELD

The present disclosure relates to a laser mount and system that enables a remote viewer of an operating room to direct a laser in the operating room in order to improve interaction and communication between a remote viewer and those present in the operating room.

BACKGROUND

Surgeries or other operations that take place in an operating room often benefit from, experts in the specific field or operation. Other remote viewers such as sales specialists have similar occasion to be in the operating room. However, due to expenses, safety reasons, and logistics, all these people may not be able to be physically present in the operating room.

Current systems allow a remote viewer to view a camera view of the operating room and mark up screenshots of that camera view. However, communicating this way often involves those in the operating room looking up from their patient or surgery in order to look at the marked-up screen.

SUMMARY

In some embodiments, a laser mount for fixedly coupling a laser pointer may include a first layer. The laser mount may also include a second layer including a first end and a second end, a connection between the first layer and the first end forming a spring-tensioned hinge, such that deflection of the second end about the connection imparts a spring tension to the second layer, and the second end being spaced apart from the first layer. The laser mount may further include a first adjustment screw configured to vertically couple the first layer and the second end and to adjust a vertical spring tension between the first layer and the second layer. The laser mount may further include a second adjustment screw configured to horizontally couple the first layer and the second end and to adjust a horizontal spring tension between the first layer and the second layer.

In some embodiments, the first layer of the laser mount may further include a first raised side. The second end may further include a second raised side. The second adjustment screw may be configured to be installed on at least one of the first raised side or the second raised side.

In some embodiments, the first layer may further include a slot. The first end may further include a protruding tab. The connection between the first layer and the first end may include at least one of an insertion of the protruding tab into the slot or a welding of the protruding tab and the slot.

In some embodiments, the first layer may further include an indentation portion configured to assist coupling a cable or a wire to the first layer.

In some embodiments, the connection between the first layer and the first end may include at least one of a welding, a melted filler material connecting the first layer and the first end, a screw, or an adhesive.

In some embodiments, the second layer may further include a portion forming a zig-zag shape or an S shape between the first end and the second end. In some embodiments, the portion may include a number of loops protruding from two sides. In some embodiments, the number is four. In some embodiments, the portion may be formed by die cutting or laser cutting.

In some embodiments, the second layer may be configured to fixedly couple a laser pointer. In some embodiments, the second layer may further include an indentation portion configured to assist fixedly coupling the laser pointer. In some embodiments, the laser mount is positioned within a housing, and the housing may include an exit for a laser beam emitted from the laser pointer.

In some embodiments, the second end may have a vertical distance from the first layer. In some embodiments, the first adjustment screw may be configured to be installed on the second end and to further adjust the vertical distance.

In some embodiments, the second adjustment screw may be further configured to adjust a horizontal shift of the second end.

In some embodiments, the second adjustment screw may be further configured to apply the horizontal spring tension throughout an entire range of motion of the second end.

In some embodiments, the first layer may further include a third end having a plurality of linear notches, the second end may include an extrusion, and the extrusion may be configured to align with one of the plurality of linear notches.

In some embodiments, the laser mount may further include a portion configured to fix the first layer to a part fixedly attaching to a camera, wherein the portion may include at least one of a screw, a hole, a welding, or an adhesive. In some embodiments, the part may include a printed circuit board fixedly attaching to the camera. In some embodiments, the laser mount may further include a spacer placed between the first layer and the part.

In some embodiments, a system may include a laser mount configured to fixedly coupling a laser pointer to a camera. The system may also include a control device communicably coupled to the laser mount. The system may further include a network communicably coupled to the control box. The system may further include a processor communicably coupled to the network. The laser mount may include: a first layer; a second layer including a first end and a second end, a connection between the first layer and the first end forming a spring-tensioned hinge, such that deflection of the second end about the connection imparts a spring tension to the second layer, the second end being spaced apart from the first layer, and the second layer being configured to fixedly couple the laser pointer; a first adjustment screw configured to vertically couple the first layer and the second end and to adjust a vertical spring tension between the first layer and the second layer; and a second adjustment screw configured to horizontally couple the first layer and the second end and to adjust a horizontal spring tension between the first layer and the second layer.

In some embodiments, the control device may be configured to switch between an on status and an off status of the laser pointer.

In some embodiments, the system may further include a relay communicably coupled to the control device and configured to control power of the laser pointer, wherein the control device may be further configured to: receive a command from the processor via the network, and based on the command, enable or disable the relay to control the power of the laser pointer.

In some embodiments, the control device may be further communicably coupled to the camera and configured to control the camera to view a position, wherein a laser beam emitted from the laser pointer points to the position when the camera is viewing the position.

In some embodiments, the control device may be further configured to: receive a command from the processor via the network; and based on the command, control an action of the camera to view the position, wherein the action may include at least one of panning, tilting, or zooming.

In some embodiments, the laser pointer may be further communicably coupled to the camera. The control device may be further communicably coupled to the camera. The first adjustment screw and the second adjustment screw may be automated screws. The control device may be configured to: actuate at least one of the first adjustment screw or the second adjustment screw to calibrate a position of a laser beam emitted from the laser pointer in a view of the camera.

In some embodiments, the network may be further communicably coupled to the camera and configured to transmit audiovisual data between the camera and the processor.

In some embodiments, the processor may be configured to perform at least one of generating telestration of the audiovisual data, editing the audiovisual data, presenting the audiovisual data on an interface, encrypting the audiovisual data, or storing the audiovisual data.

In some embodiments, the system may further include a plurality of audiovisual source devices communicatively coupled to the network and to transmit audiovisual data to the processor, wherein the plurality of audiovisual source devices may include at least one of a picture archive and communication system, a personal computer, a digital imaging and communications in medicine viewer, an endoscopy, an arthroscopy, a surgical light camera, a vital sign, a camera incision site, an operating room scene camera, a guidance system, or a back table camera.

In some embodiments, a system for remote participation of a surgical operation in an operating room may include a first computer located outside the operating room and configured to run a first application. The system may also include a second computer located inside the operating room and configured to run a second application. The system may further include a laser mount located inside the operating room and configured to fixedly coupling a laser pointer to a camera, wherein the camera may be configured to generate a view of the operating room, and the laser pointer may be configured to emit a laser beam pointing to a position in the view. The system may further include a plurality of applications configured to be run on a third computer and to enable a bi-directional communication of audiovisual data associated with the surgical operation between the first application and the second application, wherein the audiovisual data may include the view of the operating room, wherein the first application may be configured to receive a control action for changing the view of the operating room or the position pointed by the laser beam.

In some embodiments, the first application may be configured to provide a user interface for at least one of presenting the audiovisual data, generating telestration of the audiovisual data, or receiving a comment associated with the surgical operation.

In some embodiments, the user interface may be configured to provide, before or after the surgical operation, at least one of a field for adding or editing the comment, a first user-interface element for controlling playback of the audiovisual data, a second user-interface element for controlling editing of the audiovisual data, or a third user-interface element for switching to a view of the audiovisual data concurrently displaying the comment.

In some embodiments, the view of the audiovisual data concurrently displaying the comment may include a timestamp indicator overlaying the view of the audiovisual data and a display field aside the view of the audiovisual data. The timestamp indicator may represent a timestamp when the comment is received for the audiovisual data. The timestamp indicator may be configured to enable jumping to a portion of the audiovisual data associated with the timestamp when being clicked. The display field may be configured to display an event marker including the comment and the timestamp. The event marker may be configured to enable jumping to the portion of the audiovisual data when being clicked.

In some embodiments, the user interface may be configured to display, before the surgical operation, pre-op review data associated with the surgical operation, wherein the pre-op review data may include at least one of an X-RAY image, a CT scan image, medical data for determining supplies for the surgical operation, or medical data for determining preparation procedures of a patient of the operation.

In some embodiments, the user interface may be configured to display, after the surgical operation, post-op review data associated with the surgical operation, wherein the post-op review data may include at least one the audiovisual data, the telestration, or the comment.

In some embodiments, the user interface may be configured to display, during the surgical operation, at least one of a first field displaying the view of the operating room, a second field displaying a user of the first computer, a third field displaying a plurality of thumbnail views provided by a plurality of audiovisual source devices located in the operating room, a fourth field displaying an enlarged view of a thumbnail view of the plurality of thumbnail views after the thumbnail view is selected, a fifth field for adding the comment, and wherein the fourth field may include control elements for recording the enlarged view, generating the telestration, or receiving the control action.

In some embodiments, the interface is a first interface, and the second application may be configured to provide a second user interface for at least one of presenting the audiovisual data, presenting the telestration, or presenting the comment.

In some embodiments, the first application may be further configured to: receive a comment associated with the surgical operation; and generate a snapshot or a video clip of the audiovisual data, wherein the snapshot or the video clip may include the comment.

In some embodiments, the audiovisual data may further include a video stream of a user of the first computer. In some embodiments, the second application may include a service configured to merge the view of the operating room and the video stream to the audiovisual data. In some embodiments, the service may be communicably coupled to the first application via a peer-to-peer connection.

In some embodiments, the second application may include a service configured to store at least a portion of the audiovisual data on the second computer.

In some embodiments, the system may further include a fourth computer located outside the operation room and configured to run a third application, wherein the third application may be configured to control access by the first computer to at least one of the second computer or the plurality of applications. In some embodiments, the plurality of applications may include a service configured to initiate the bi-directional communication.

In some embodiments, the plurality of applications may include a service configured to verify permission of the first computer to access at least one of the second computer or the plurality of applications.

In some embodiments, the system may further include a database communicably coupled to at least one of the plurality of applications and configured to store the audiovisual data.

In some embodiments, the system may further include a database communicably coupled to at least one of the plurality of applications and configured to store patient data associated with a patient of the surgical operation, wherein the patient data may include at least one of information for identifying the surgical operation, a name of the patient, a medical history of the patient, identification information for associating the patient and the audiovisual data. In some embodiments, the plurality of applications may include a first service configured to: receive electronic health record (EHR) data from a hospital EHR system; and integrate the EHR data to the patient data. In some embodiments, the first service may be further configured to, based on a determination that a format of the EHR data is incompatible with a format of the patient data, convert the format of the EHR data to be compatible with the format of the patient data. In some embodiments, the plurality of applications may further include a second service configured to send location data to the hospital EHR system, and the location data may include a location hierarchy of identification information of the operating room, a department the operating room belonging to, a hospital of the department belonging to, or a facility the hospital belonging to. In some embodiments, the second service may be further configured to perform at least one of generating a patient report or providing data searching.

In some embodiments, a laser mount may be produced by a method, and the method may include forming a first layer with a rigid material. The method may also include forming a second layer with the rigid material, wherein the second layer may include a first end and a second end. The method may further include cutting the second layer to form a zig-zag shape or an S shape along a portion of the second layer between the first end and the second end. The method may further include connecting the first layer and the first end to form a spring-tensioned hinge, such that deflection of the second end about the connection imparts a spring tension to the second layer, and the second end being spaced apart from the first layer with a vertical distance. The method may further include vertically coupling the first layer and the second end using a first adjustment screw, the first adjustment screw being configured to adjust a vertical spring tension between the first layer and the second layer. The method may further include horizontally coupling the first layer and the second end using a second adjustment screw, the second adjustment screw being configured to adjust a horizontal spring tension between the first layer and the second layer.

In some embodiments, the rigid material may include at least one of a metal, a composite, or a plastic.

In some embodiments, cutting the portion may include die cutting the portion or laser cutting the portion.

In some embodiments, cutting the portion may include cutting opposite sides of the portion.

In some embodiments, the portion may have a rectangular shape and may include a plurality of S-shape loops.

In some embodiments, connecting the first layer and the first end to form the spring-tensioned hinge may include: forming a slot on the first layer; forming a protruding tab on the first end; and connecting the first layer and the first end by at least one of an insertion of the protruding tab into the slot or a welding of the protruding tab and the slot.

In some embodiments, connecting the first layer and the first end to form the spring-tensioned hinge may include connecting the first layer and the first end by at least one of: welding the first layer to the first end; melting a filler material to connect the first layer and the first end; screwing the first layer to the first end; or connecting the first layer and the first end using an adhesive.

In some embodiments, horizontally coupling the first layer and the second end using the second adjustment screw may include: forming a first raised side on the first layer; forming a second raised side on the second end; and installing the second adjustment screw on at least one of the first raised side or the second raised side.

In some embodiments, the method may further include: forming a first indentation portion on the first layer for assisting coupling a cable or a wire to the first layer; and forming a second indentation portion on the second layer for assisting fixedly coupling a laser pointer to the second layer.

In some embodiments, the method may further include: forming a plurality of linear notches on a third end of the first layer; and forming an extrusion on the second end, wherein the extrusion may be configured to align with one of the plurality of linear notches.

In some embodiments, the method may further include: forming a contact on the first layer, wherein the contact may be configured to fix the first layer to a part fixedly attached to a camera, and wherein the contact may include at least one of a screw, a hole, a welding, or an adhesive.

In some embodiments, the method may further include: providing a spacer between the first layer and the part.

In some embodiments, a method for calibrating alignment between a laser pointer coupled to a camera may include receiving, on a computer screen, a video stream showing a camera view. The method may also include coupling the laser pointer to the camera using a laser mount, wherein the laser pointer emits a laser dot at a predetermined position and points in a same direction as the camera. The laser mount may include: a first layer, a second layer including a first end and a second end, a connection between the first layer and the first end forming a spring-tensioned hinge, such that deflection of the second end about the connection imparts a spring tension to the second layer, the second end being spaced apart from the first layer, and the second layer being configured to fixedly couple the laser pointer, a first adjustment screw configured to vertically couple the first layer and the second end and to adjust a vertical spring tension between the first layer and the second layer, and a second adjustment screw configured to horizontally couple the first layer and the second end and to adjust a horizontal spring tension between the first layer and the second layer. The method may further include adjusting at least one of the first adjustment screw or the second adjustment screw until the laser dot is centered at the camera view. The method may further include securing the first adjustment screw and the second adjustment screw.

In some embodiments, the first layer may further include a third end having a plurality of linear notches, the second end may include an extrusion. Adjusting at least one of the first adjustment screw or the second adjustment screw may include adjusting the second adjustment screw until the extrusion aligns with a center of the plurality of linear notches.

In some embodiments, adjusting at least one of the first adjustment screw or the second adjustment screw may include: adjusting the camera view to a first zoom level; adjusting at least one of the first adjustment screw or the second adjustment screw until the laser dot is centered at the camera view at the first zoom level; increasing the first zoom level to a second zoom level higher than the first zoom level; and adjusting at least one of the first adjustment screw or the second adjustment screw until the laser dot is centered at the camera view at the second zoom level.

In some embodiments, the method may further include, after the laser dot being centered at the camera view and before securing the first adjustment screw and the second adjustment screw, performing: keeping the laser pointer and the camera unadjusted for a time period, wherein the camera is on during the time period; and based on a determination that the laser dot is not centered at the camera view after the time period, readjusting at least one of the first adjustment screw or the second adjustment screw until the laser dot is centered at the camera view.

In some embodiments, securing the first adjustment screw and the second adjustment screw may include securing the first adjustment screw and the second adjustment screw using an adhesive.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

A remote viewing system allows a remote viewer to fully participate and communicate with those in the operating room, according to embodiments of the present disclosure. Embodiments of the present disclosure enable a more real-time and seamless way for a remote viewer to interact with and/or guide those in the operating room. This can improve safety, efficiency, and cost of operating room procedures, according to some embodiments.

A laser remote viewing system is disclosed. The system enables a remote viewer of an operating room to direct a laser in the operating room. In some embodiments, the laser is mounted on a camera and calibrated to appear at a pre-determined spot in relation to the display of the camera. The remote viewer may control where the laser appears in the operating room, allowing the remote viewer to specify specific areas of interest, e.g., to point out a problem area on a patient or direct a surgeon to operating room equipment.

In some embodiments, the laser remote viewing system is utilized in applications outside of an operating room.

In some embodiments, the laser remote viewing system includes a mount that enables a laser to be attached to a camera. The mount enables the laser to be precisely calibrated in accordance with the camera. In some embodiments, the mount consists of two spring-tensioned pieces that enable the laser to be adjusted in the horizontal and vertical planes while keeping the laser stable when a final position is reached.

As used herein, unless specifically stated otherwise, the term "or" encompasses all possible combinations, except where infeasible, For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Figure 1:
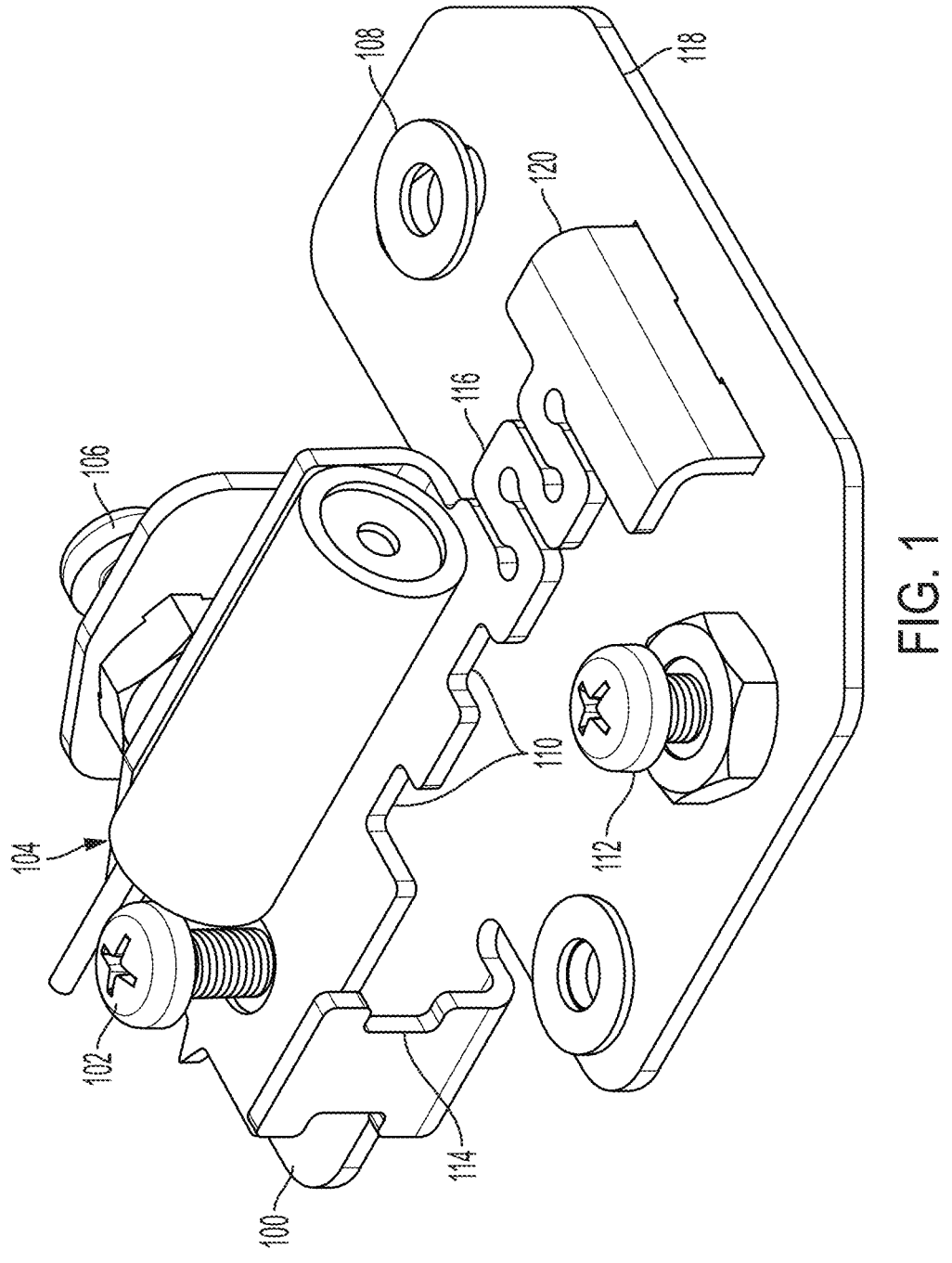
FIG. 1 shows a laser mount in accordance with some embodiments of the disclosure.

FIG. 1 shows a laser mount in accordance with some embodiments of the disclosure. In the figure shown, laser 104 is positioned on top of laser mount 100. Laser mount 100 comprises two layers, layer 118 on the bottom and layer 120 on the top. In various embodiments, the layers comprise metal, composites, plastics, or a rigid material.

Vertical adjustment screw 102 is used to adjust the distance between layer 120 and layer 118. For example, tightening vertical adjustment screw 102 would bring layer 120 higher up, increasing the vertical distance between layer 120 and 118. In some embodiments, the laser mount is spring tensioned in both the vertical and horizontal planes. For example, layers 118 and 120 are originally positioned to be parallel to one other, and adjusting vertical adjustment screw 102 introduces tension by pushing layer 120 up. Horizontal adjustment screw 106 can be manipulated to shift the laser horizontally. Similarly, in some embodiments, layer 120 is originally positioned to be all the way to one side of layer 118 and horizontal adjustment screw 106 introduces tension by pushing layer 120 towards a side opposite said side of layer 118. By using spring tension in both directions, the laser mount enables precise adjustments of the laser's position that is secure. For example, the movement in both directions is analogous to the tension that a pair of tweezers exhibits. Known solutions in the art, such as using sliders, would result in the laser easily sliding around, losing its calibrated position. The monolithic design as shown ensures that pieces do not rattle around, according to some embodiments.

As shown, layer 120 comprises a material that acts as a two-way hinge, spring-tensioned hinge, or material that is spring-loaded in two orthogonal planes. Layer 120 comprises a zig-zag shape. For example, a portion of layer 120 is a rectangle from which portions of material are cut out from opposite sides to create a winding road pattern. That is, the material looks like a strip that is bent at ninety degrees to form the loops in an "S" shape. In some embodiments, the portion has three loops wherein two of the loops protrude from one side and one loop protrudes from the other (e.g. an "s" shape that is appended at the bottom with the top half of another "s" shape). In other embodiments, the number of loops may be 2, 4, or greater. This geometry is illustrated in, for example, at 116 of FIG. 1 as well as in the other figures.

In various embodiments, the hinge "zig-zag" portion can be die cut or laser cut from a solid piece of metal, composite, or other material. The material may be chosen based on its stiffness, thickness, and other physical properties, such as its spring properties. The shape of the hinge may aid in controlling the stiffness of layer 120, which acts as a spring.

Screw 112 as shown provides a contact point for the module to be mounted on a camera apparatus or other in-between apparatus that is then mounted to a camera. In some embodiments, to avoid damaging a structure below (e.g., a PCB), the material of screw 112 may be plastic (e.g., PA12 or the like). Hole 108 in layer 118 is also allows a screw to be inserted to mount laser mount 100 to a camera apparatus or other device. In various embodiments, various holes in layer 118 may be positioned to facilitate mounting. In some embodiments, when various holes in layer 118 are positioned to facilitate mounting, screw 112 may form a third contact point that may remove all degrees of freedom of laser mount 100. In various embodiments, other mounting methods other than screws are used, such as welding, adhesive, or other method of attaching layer 118 to a desired device.

Indentations 110 are spots that are carved into the mount to allow cables or other ties to be placed to hold the laser in place. For example, cables or ties may be used to keep laser 104 flush with layer 120 of the laser mount. Indentation 114 may be used to keep any cables or wires in place. For example, wires that are used to power laser 104 may be kept neat and organized around indentation 114. Various embodiments may utilize various indentations in different places in either layer 119 or layer 120 to keep components secured or organized.

Figure 2:
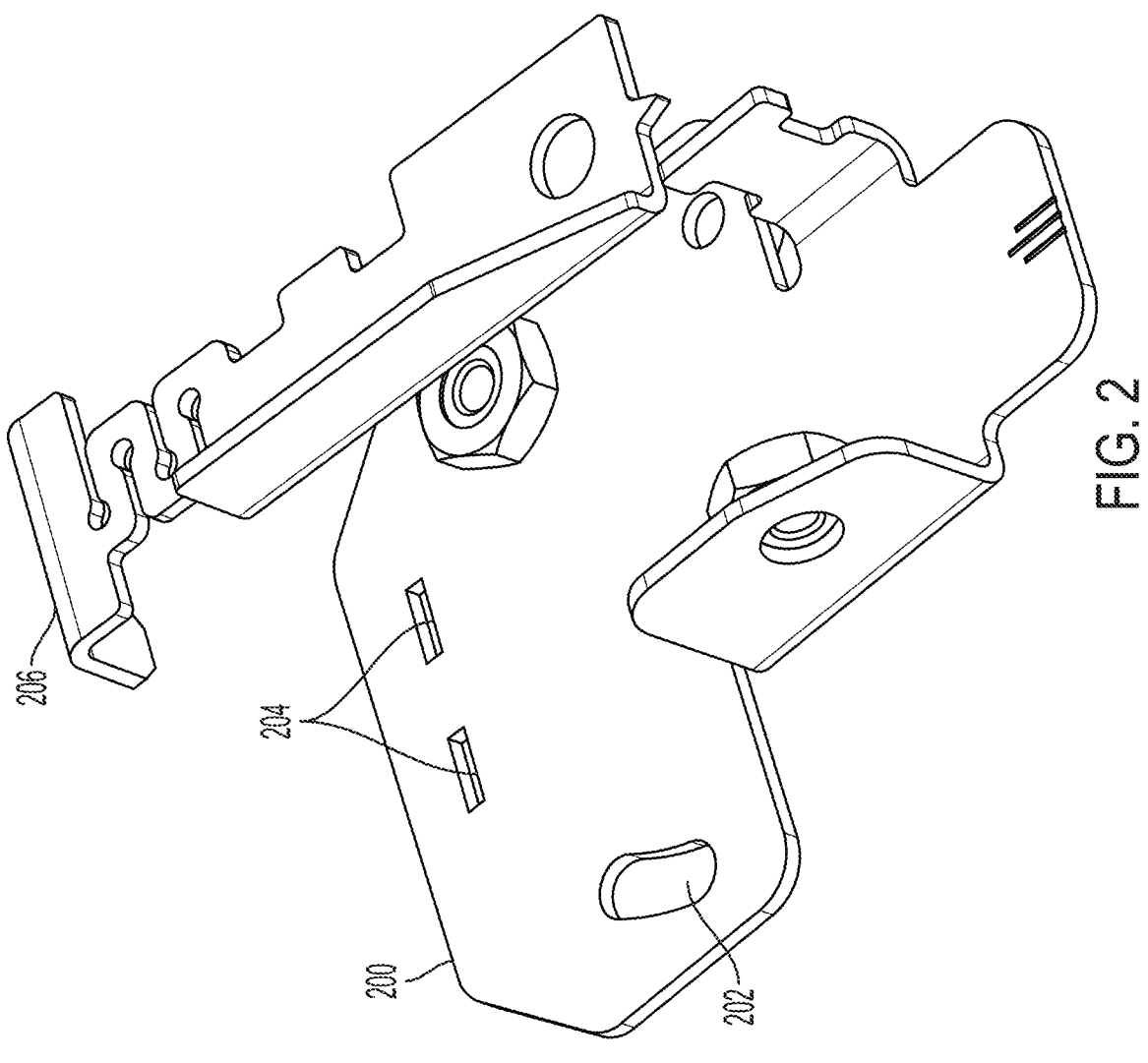
FIG. 2 depicts two layers of a laser mount in accordance with some embodiments of the disclosure.

FIG. 2 depicts two layers of a laser mount in accordance with some embodiments of the disclosure. In some embodiments, layer 206 and layer 200 are manufactured separately. Layer 206 and layer 200 may each be respectively made from one piece of metal, composite, or other material. As shown, layer 200 comprises slots 204 wherein tabs protruding from layer 206 may be inserted. The two layers can be connected using those slots. In various embodiments, 1, 2, 3, 6, or various numbers of slots or tabs may be used to attach the two layers. In the example shown, both layer 206 and layer 200 have a raised side on their left. These raised sides may enable layer 206 and a laser to positioned on layer 206 to be adjusted horizontally.

In the example shown, hole 202 in layer 200 is an oblong shape. In some embodiments, hole 202 is large enough such that layer 200 can be screwed onto an apparatus (e.g., a camera) with flexibility as to how layer 200 is positioned on the apparatus. For example, a pre-existing camera may require a screw size 1 and have a screw hole in a certain spot. By creating hole 202 to be larger than required by screw size 1, there are multiple possible ways that layer 200 can be mounted on the pre-existing camera.

Figure 3:
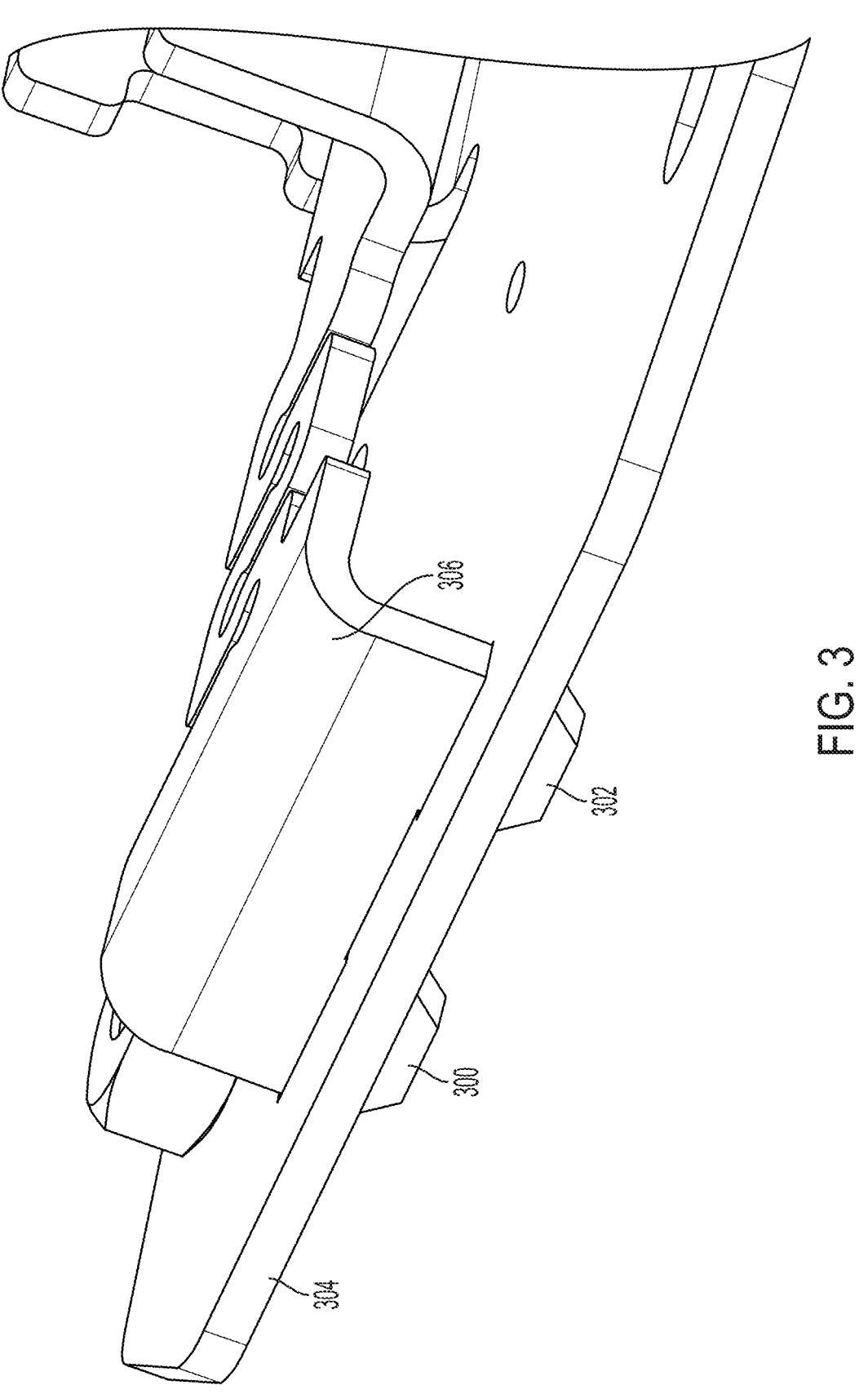
FIG. 3 depicts the connection point between two layers of a laser mount in accordance with some embodiments of the disclosure.

FIG. 3 depicts the connection point between two layers of a laser mount in accordance with some embodiments of the disclosure. In the example shown, layer 306 has two protruding tabs, tab 300 and tab 302, which are inserted into slots in layer 304. In some embodiments, the two layers of the laser mount are connected at only one side, which creates the spring tension and adjustability in layer 206. In some embodiments, the two layers are welded together. The welder can simply weld tabs 300 and 302 to layer 304 in order to attach the layers. This simplifies manufacturing, according to some embodiments.

In other embodiments, a filler material may be melted and used to connect layers 304 and layer 306. Any other method may be used to connect layers 306 and 304, for example they may be screwed together or attached with an adhesive. In some embodiments, layers 306 and 304 are attached in a method that strongly attaches them such that the connection can withstand spring tension from layer 306.

Figure 4:
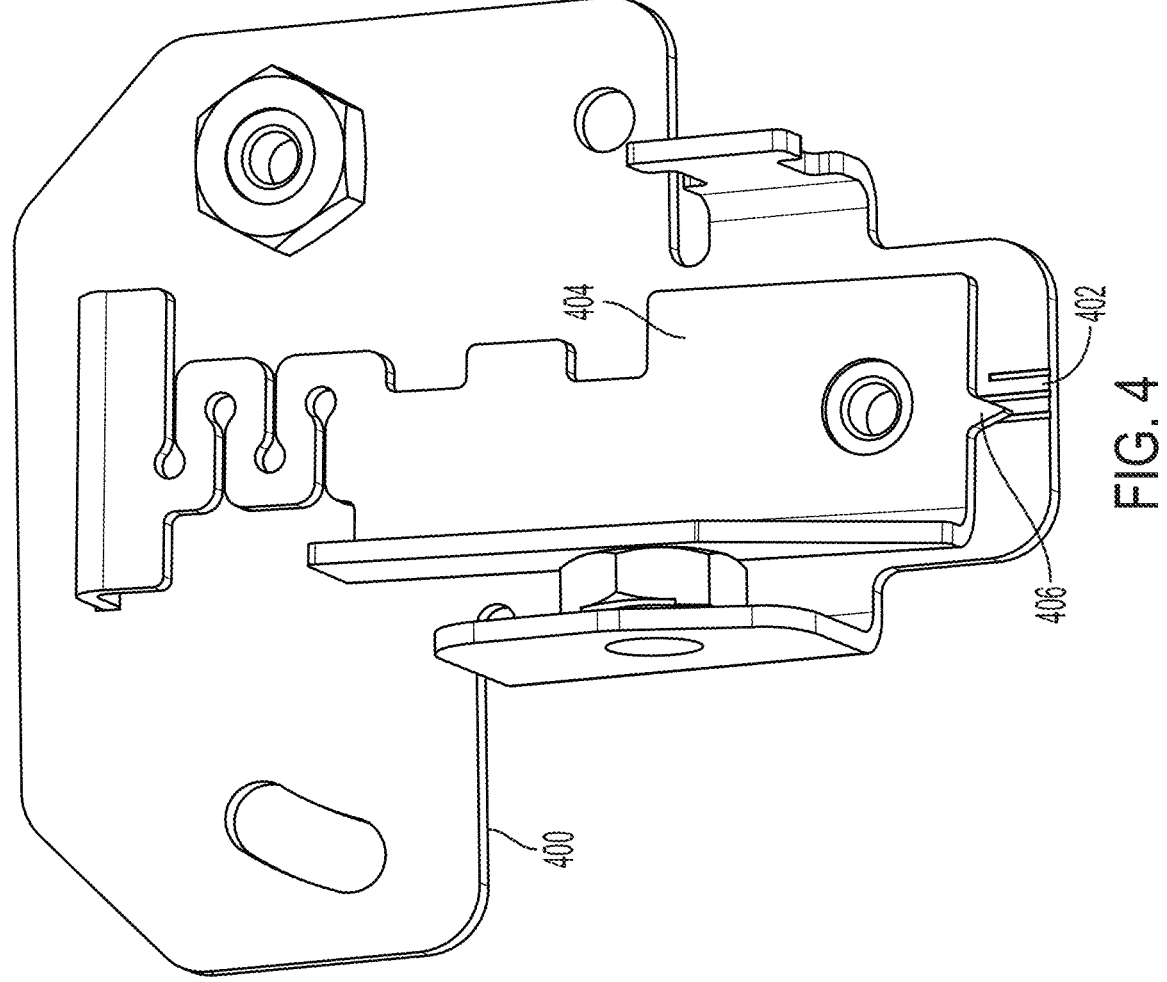
FIG. 4 depicts a top view of a laser mount in accordance with some embodiments of the disclosure.

FIG. 4 depicts a top view of a laser mount in accordance with some embodiments of the disclosure. In the example shown, layer 404 is arranged such that extrusion 406 is positioned to align with the left-most notch of notches 402 on layer 400. In some embodiments, layers 404 and 400 are welded together such that layer 404 is positioned adjacent to a raised side of layer 400 from which a horizontal adjustment screw will be installed. In the example shown, layers 404 and 400 are welded together such that extrusion 406 of layer 404 is aligned with the notch in layer 402 that is closest to the raised side of layer 400 from which a horizontal adjustment screw will be installed. In the example shown, pushing layer 404 to the right will introduce spring tension. Such spring tension allows for layer 404 to be adjusted precisely and prevent sliding. In some embodiments, layer 404 is similarly tensioned in the vertical dimension.

In some embodiments, to calibrate the laser position, a horizontal adjustment screw will be adjusted until extrusion 406 is aligned with a center notch of notches 402.

Figure 5:
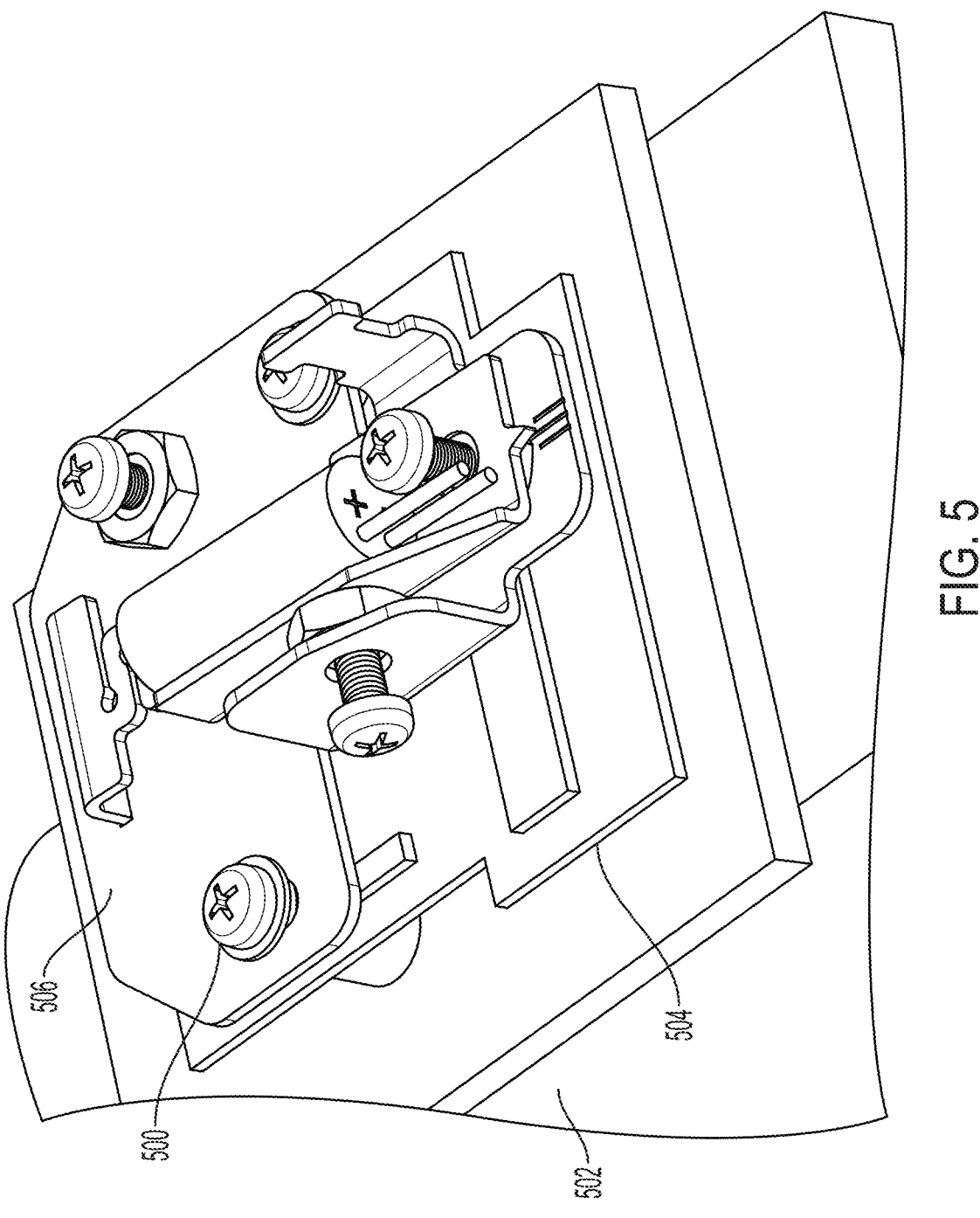
FIG. 5 depicts a laser mount in accordance with some embodiments of the disclosure.

FIG. 5 depicts a laser mount in accordance with some embodiments of the disclosure. In the example shown, laser mount 506 is mounted on printed circuit board 504, which is part of camera 502. In the example shown, screw 500 holds laser mount 506 to printed circuit board 504 and camera 502.

Figure 6:
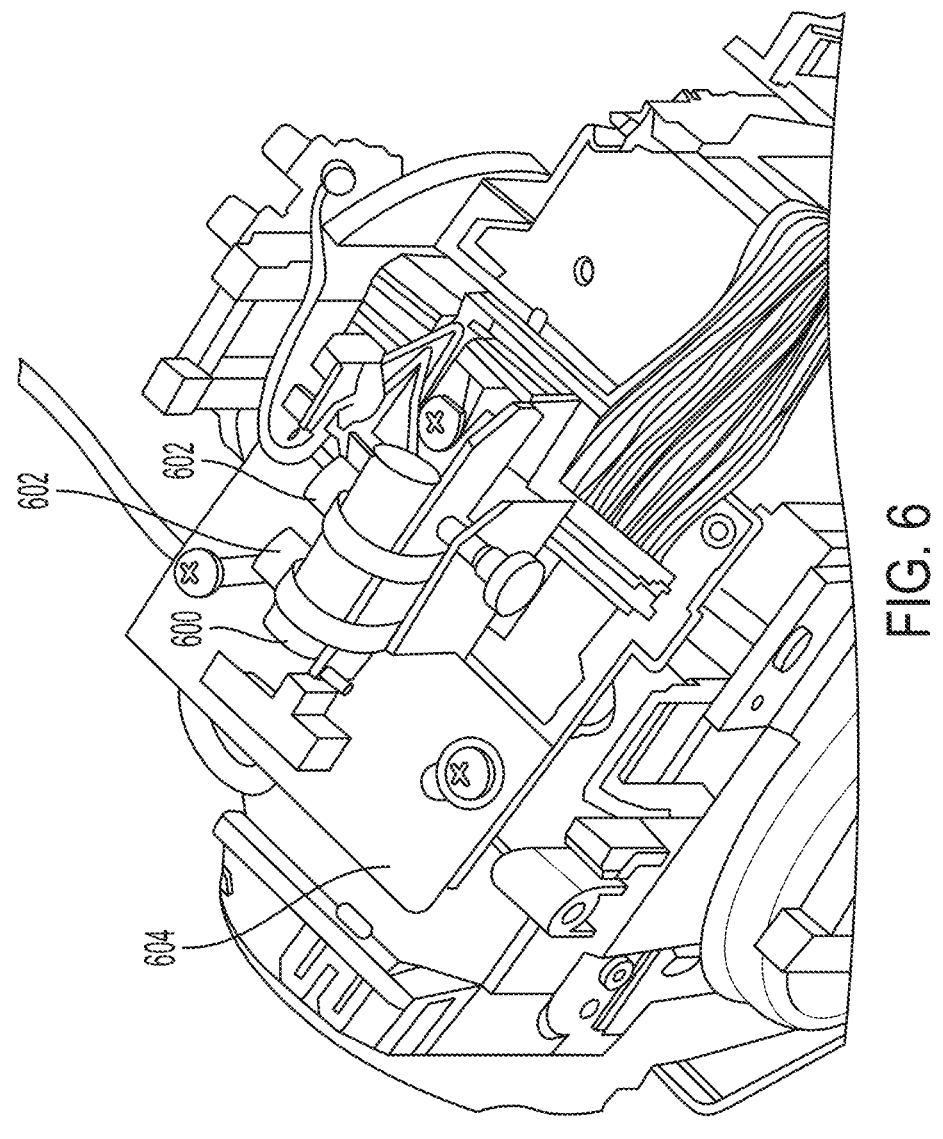
FIG. 6 depicts a laser mount with cables in accordance with some embodiments of the disclosure.

FIG. 6 depicts a laser mount with cables in accordance with some embodiments of the disclosure. In the example shown, zip ties 602 are used to secure laser 600 to mount 604.

Figure 7:
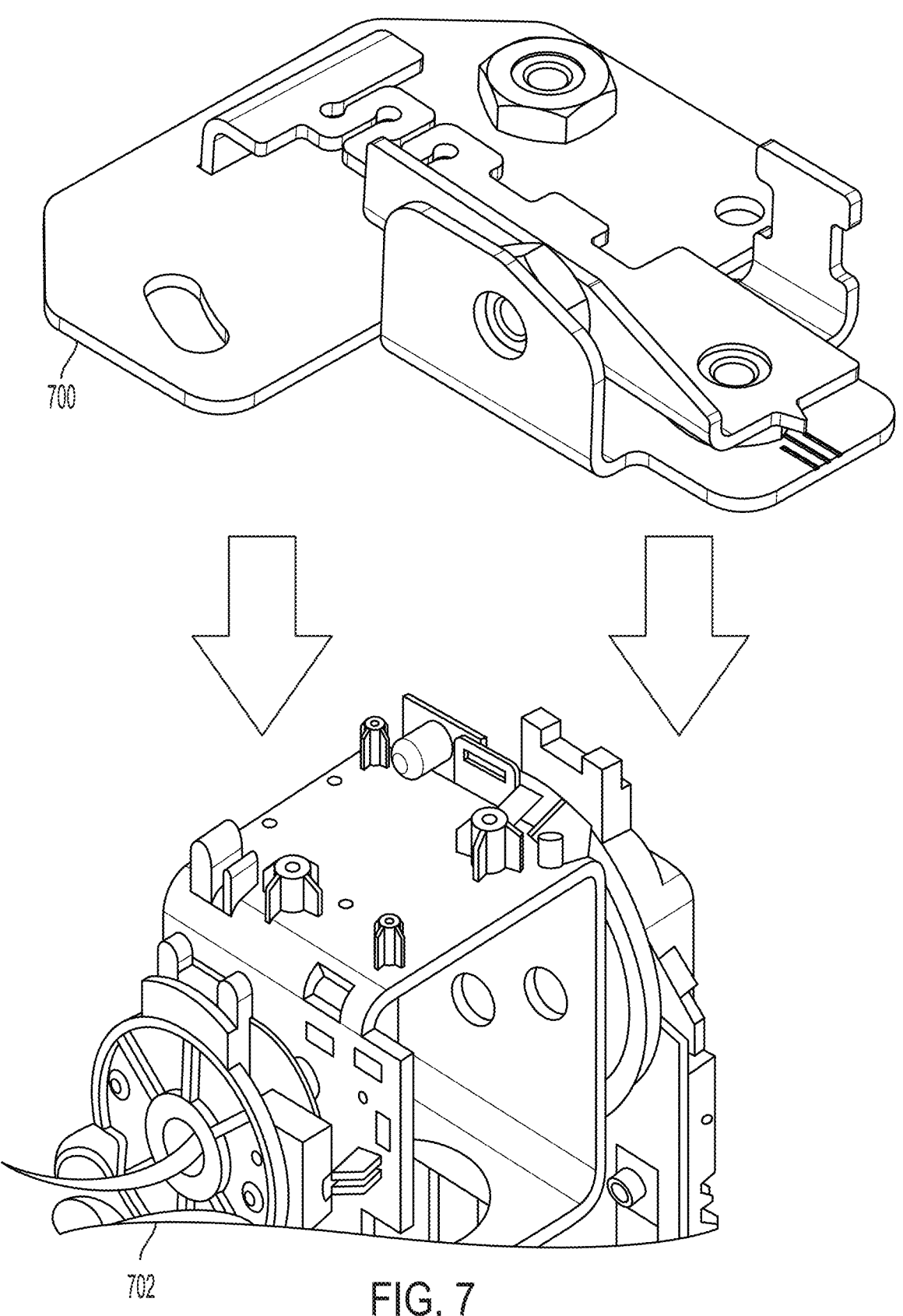
FIG. 7 depicts how a laser mount is attached to a camera, in accordance with some embodiments of the disclosure.

FIG. 7 depicts how a laser mount is attached to a camera, in accordance with some embodiments of the disclosure. In the example shown, laser mount 700 is placed atop apparatus 702. Laser mount 700 may be screwed into apparatus 702. In some embodiments, apparatus 702 comprises an off-the-shelf camera. For example, apparatus 702 may comprise a Sony SRG-300 H Dome Camera or any other commercially available camera. In some embodiments, the screw holes in laser mount 700 are positioned based on screw holes in the apparatus the laser mount will be mounted on.

In some embodiments, a Sony SRG (300h, X120 or x400) camera, PICOTRONIC DI650-0.4-5 (8×21) laser, CX mounting bracket for the camera, or other kinds of cameras, lasers, and mounting brackets are used. In some embodiments, a control box is also used as part of the system to control the laser's operation.

Figure 8:
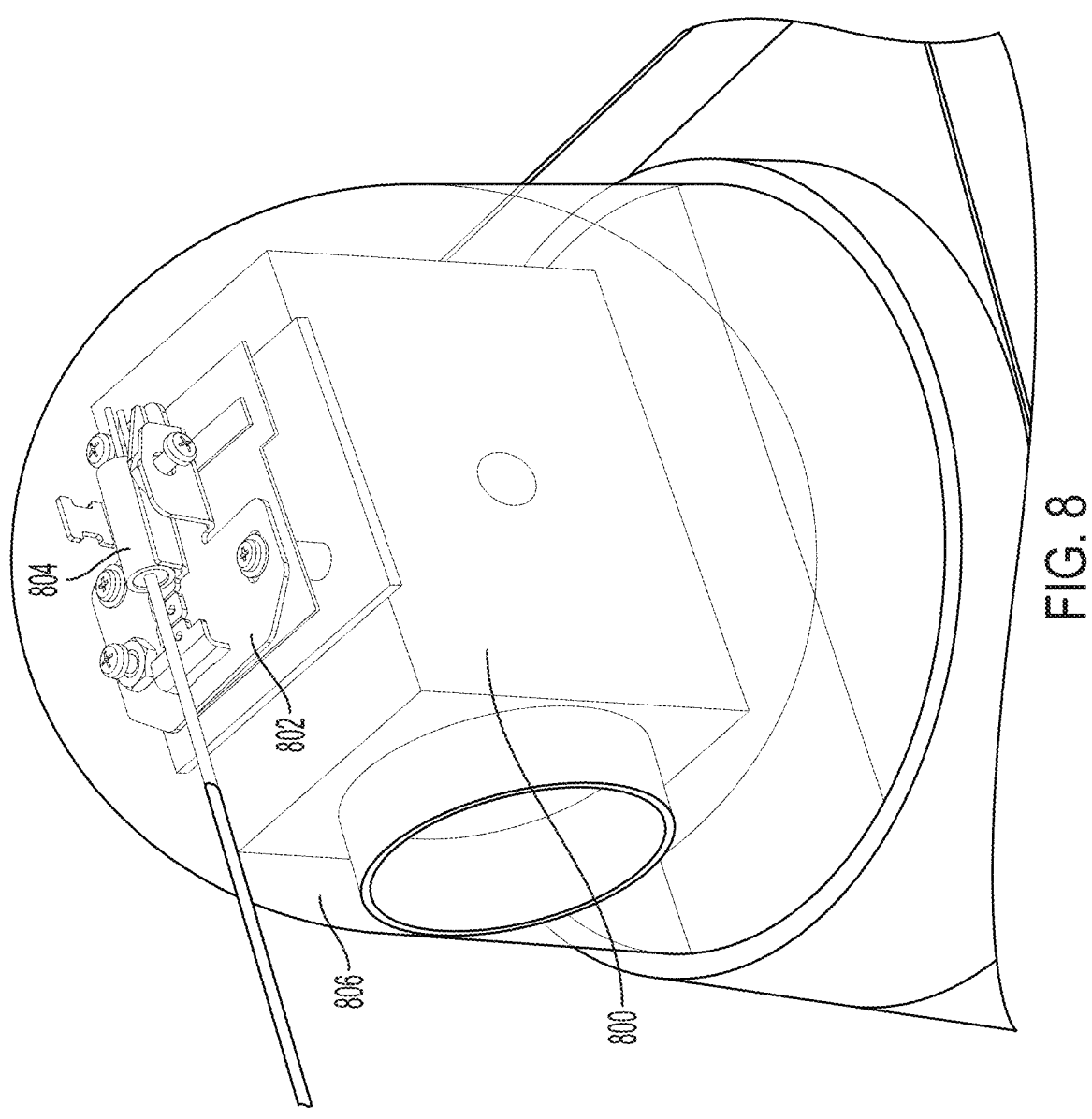
FIG. 8 depicts how a laser mount is integrated with a camera, in accordance with some embodiments of the disclosure.

FIG. 8 depicts how a laser mount is integrated with a camera, in accordance with some embodiments of the disclosure. In the example shown, laser mount 802 is mounted on camera 800 such that laser 804 and camera 800 are aligned to point in the same direction. This way, a remote viewer who views what camera 800 captures can also direct laser 804 towards something in the camera's view. In the example shown, laser mount 802 is positioned within an exterior case 806 for camera 800. In various embodiments, laser mount 802 is exposed or contains in various encasings to protect the components. In some embodiments, exterior case 806 or any alternative encasing is modified so that the laser beam can exit the housing.

Figure 9:
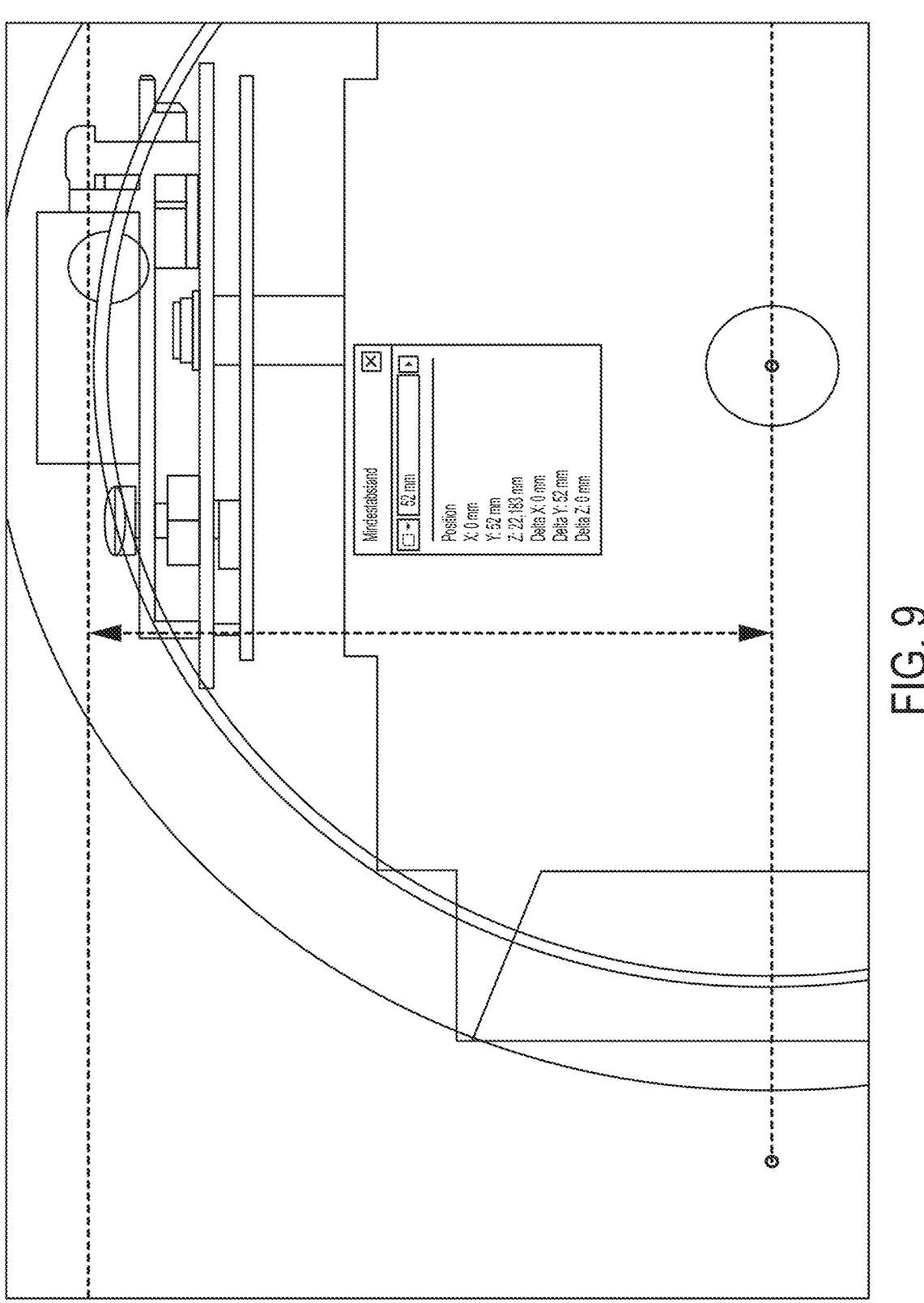
FIG. 9 depicts an axis offset between a laser and a camera, in accordance with some embodiments of the disclosure.

FIG. 9 depicts an axis offset between a laser and a camera, in accordance with some embodiments of the disclosure. When a laser is mounted on top of a camera, there will be an offset between the optical axis of the camera and the optical axis of the laser. In some embodiments, this means that the laser dot will appear in the middle of the screen only at the distance it has been calibrated to. For example, moving an object closer to or further away from the camera will lead to the laser point appearing higher or lower on the screen.

In one embodiment of the disclosure, the offset of the camera and the laser module is about 52 mm/2 inch. This means that at a high zoom level on the camera, the laser dot will be very far offset from the center of the screen or might not appear on the screen at all. Therefore, the calibration distance may be selected for the intended application.

In some embodiments, even though the used laser module has a collimated beam and a fixed focus, the size of the laser beam may increase with distance due to the divergence of the beam. For example, at a distance of 10 m the laser dot will have a size of 3-5 mm. This means that at the highest (digital) zoom level of the camera, the laser dot will fill about half of the screen at a distance of 10 m.

Figure 10:
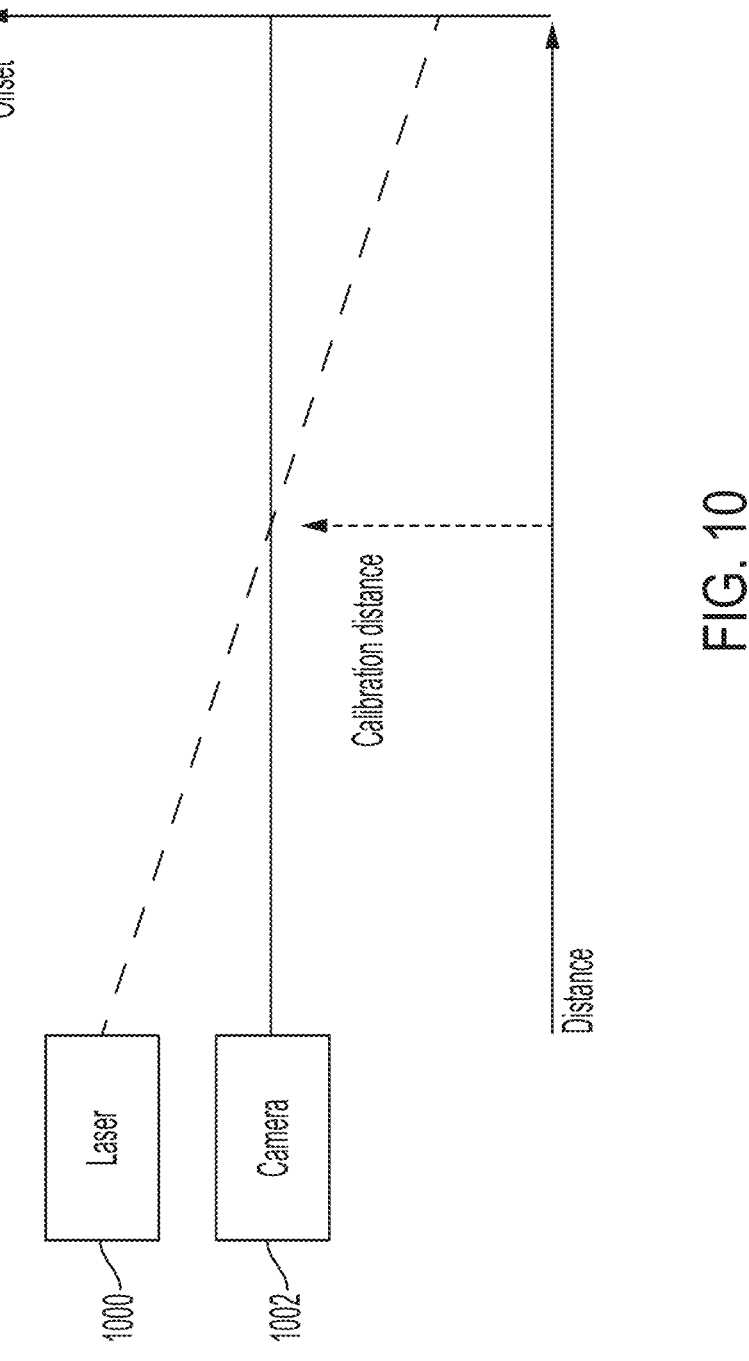
FIG. 10 is a graphical illustration of a calibration distance needed between a laser and a camera, in accordance with some embodiments of the disclosure.

FIG. 10 is a graphical illustration of a calibration distance between a laser and a camera, in accordance with some embodiments of the disclosure. As shown, the center of the camera's view matches up with the laser dot at a certain calibration distance. The laser may be calibrated to be positioned correctly on the camera. That is, the horizontal and vertical positioning of the laser may be precisely adjusted such that the laser dot matches up with the camera view.

In some embodiments, various hardware and software are used in the calibration process. For example, a Sony SRG-300H Dome Camera, remote control, HDMI Cable, PC or Laptop, HDMI to USB video grabber, VLC media player, or other video player, may be used.

In some embodiments, one or more of the following preconditions are met before starting calibration: the camera is partially disassembled, giving access to the laser module; the camera is connected to a computer; the camera image is shown on a computer screen with a crosshair overlay; the laser module is active; a suitable target is placed at the desired calibration distance; the camera is zoomed in and focused on the target; and/or the camera and/or target are oriented in such a way that only minimal tilt/pan is needed. In some embodiments, the laser is mounted to a camera that can tilt and pan (e.g. the camera itself can move).

Figure 11B:
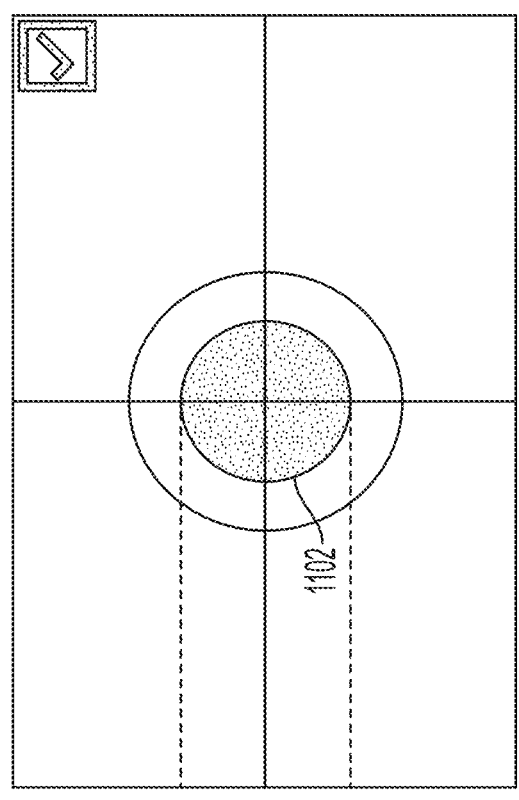
FIG. 11B depicts a completed laser calibration in accordance with some embodiments of the disclosure.
Figure 11A:
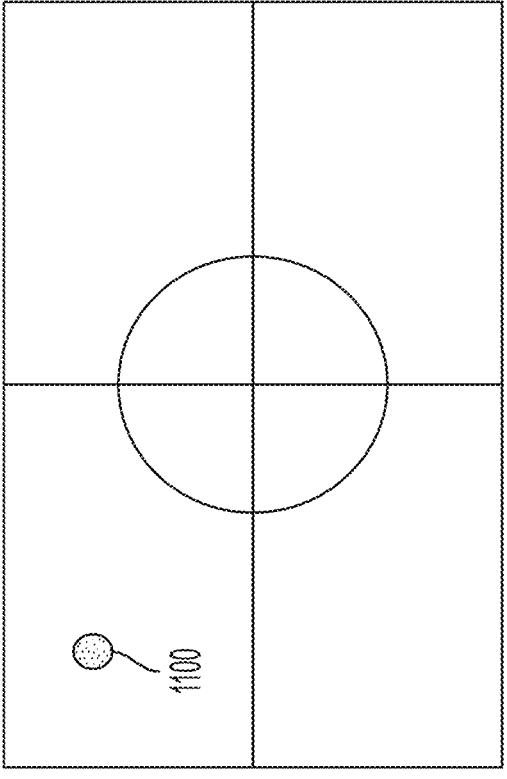
FIG. 11A depicts an initial laser calibration in accordance with some embodiments of the disclosure.

FIG. 11A depicts an initial laser calibration in accordance with some embodiments of the disclosure. In the example shown, laser dot 1100 is not in the crosshairs of the camera. It is instead off to the side. In some embodiments, a first step is positioning the laser mount, for example laser mount 802 of FIG. 8, on top of camera 800 of FIG. 8 such that the laser dot appears on the screen.

FIG. 11B depicts a completed laser calibration in accordance with some embodiments of the disclosure. In the example shown, laser dot 1102 is centered in the crosshairs of the camera. Centering the laser dot with the crosshairs of the camera allows a remote viewer to precisely and intuitively direct the laser to where the remote viewer desires.

Figure 12:
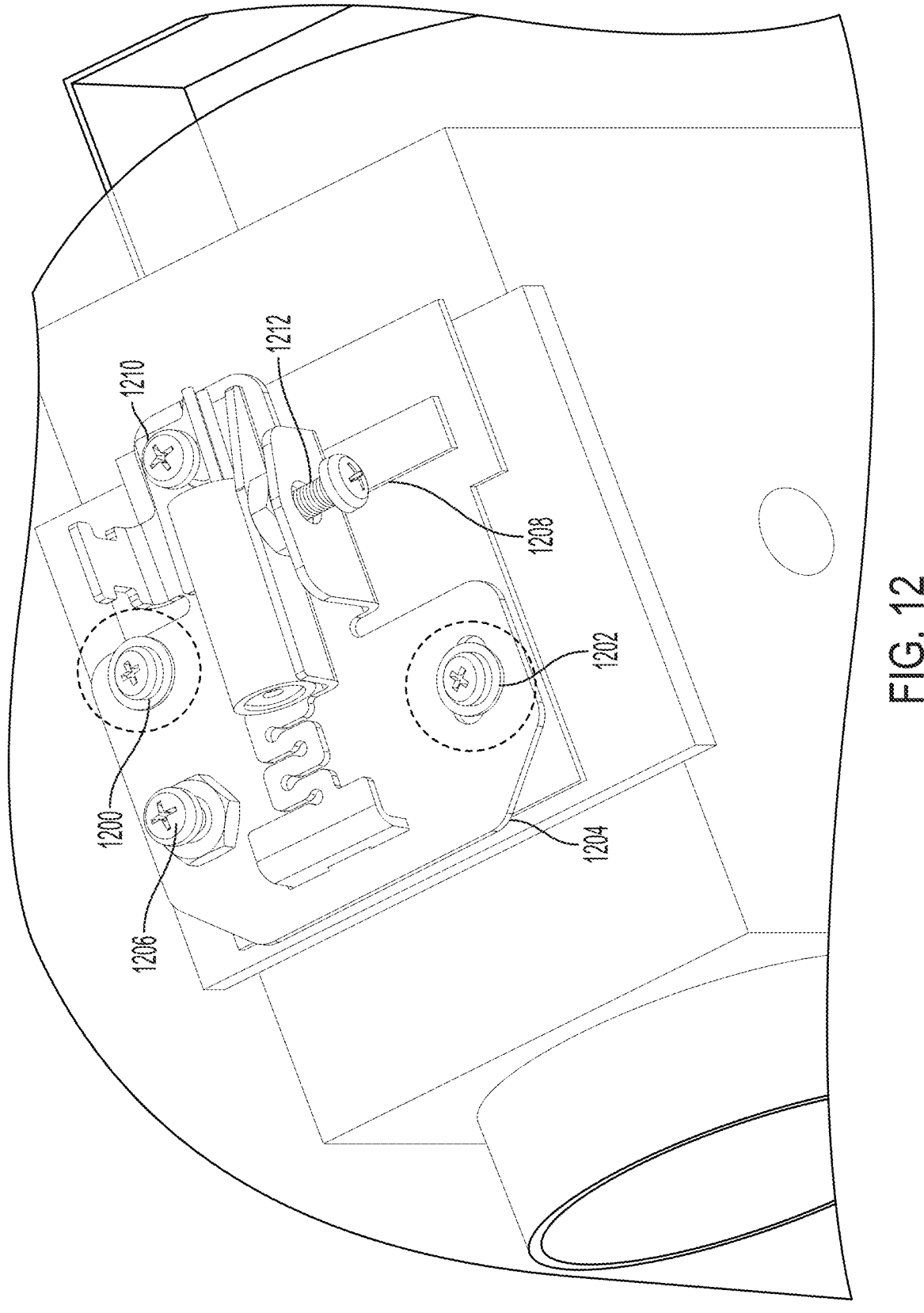
FIG. 12 depicts a top view of a laser mount that is mounted on a camera, in accordance with some embodiments of the disclosure.

FIG. 12 depicts a top view of a laser mount that is mounted on a camera, in accordance with some embodiments of the disclosure. In some embodiments, the first step of calibration is adjusting how the laser mount is mounted to the camera to make sure a laser dot is in the camera view such as is shown in FIG. 11A. In some embodiments, that is done by adjusting mounting screws 1200 and 1202. Once the position of laser mount 1204 is such that there is a laser dot in the camera view as shown in FIG. 11A, mounting screws 1202 and 1200 are tightened to secure that positioning. For example, the laser mount 1204 may be adjusted until laser dot 1100 appears on the screen. At that point, it may also be possible to adjust the vertical alignment of the laser so that the laser dot appears on the screen. Screw 1206 may also be tightened until it touches printed circuit board 1208. Screw 1206 and any additional screws may be used to increase contact points between laser mount 1204 and the camera it is attached to below.

In some embodiments, spacers made of metal, plastic, composite, rubber, or any other material may be placed between laser mount 1204 and printed circuit board 1208 to protect printed circuit board 1208 from abrasions. In some embodiments, printed circuit board 1208 is part of a camera apparatus. In some embodiments, spacers are used to protect the laser mount from whatever apparatus it is mounted on.

In some embodiments, after this is completed, fine calibration of the laser is done to reach a display as is shown in FIG. 11B, despite the module being very sensitive to minor adjustments according to some embodiments. In fact, at high zoom levels even touching one of the adjustment screws, cables or any part of the camera may temporarily bring the laser point out of adjustment. In some embodiments, the current laser mount allows adjustability in both the horizontal and vertical plane to be achieved using a single fixed joint. This eliminates any play in the hinges or connection points, according to some embodiments.

In some embodiments, the camera is placed is a low zoom level and the horizontal adjustment screw 1212 and vertical adjustment screw 1210 are adjusted, alternating between the two, until the laser dot is approximately in the middle of the screen. Then, the zoom level is increased, and the screws readjusted until the image in FIG. 11B is achieved. For example, the laser dot fills approximately ⅓ of the screen and appears in the middle of the screen.

In some embodiments, after the calibration is finished, the camera is kept switched on and sits for several hours or overnight. Then, the calibration is double checked and corrected if desired. Finally, in some embodiments, the horizontal and vertical adjustment screws 1212 and 1210 as well as the screw 1206 are secured with locking varnish or other adhesive.

In some embodiments, all the adjustments of the screws is done manually. In some embodiments, the adjustments of the screws are done via remote control, e.g. by using motors. In some embodiments, a calibration is only performed once when the laser and camera are installed.

Figure 13:
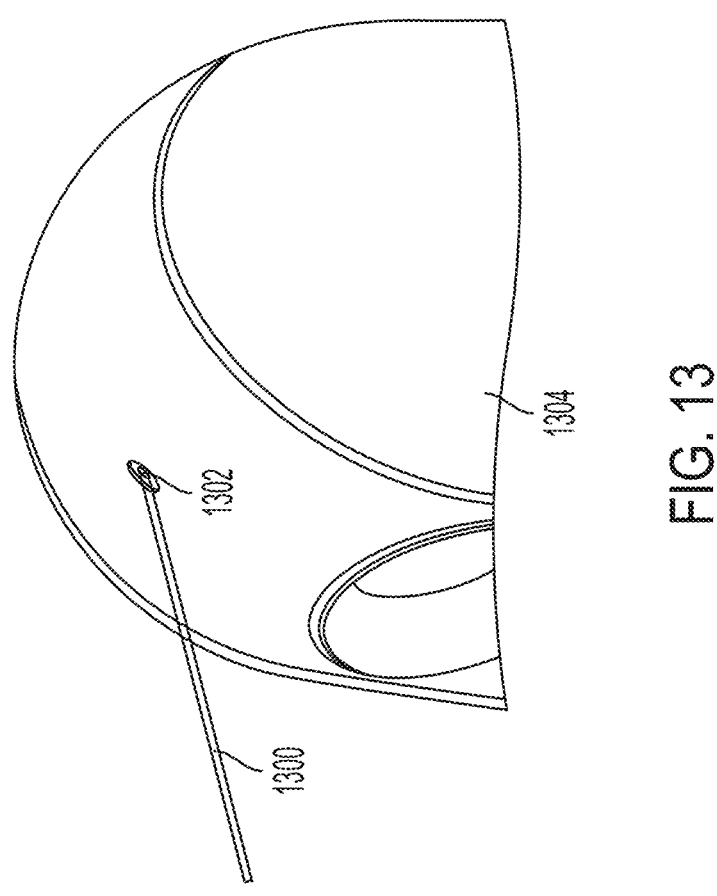
FIG. 13 depicts a laser that is enclosed within a camera, in accordance with some embodiments of the disclosure.

FIG. 13 depicts a laser that is enclosed within a camera, in accordance with some embodiments of the disclosure. In the example shown, laser beam 1300 exits hole 1302 which is in housing 1304. In some embodiments, the laser is installed in a camera that has a housing. A hole or opening may be made in the housing to allow the laser to exit the housing.

Figure 14:
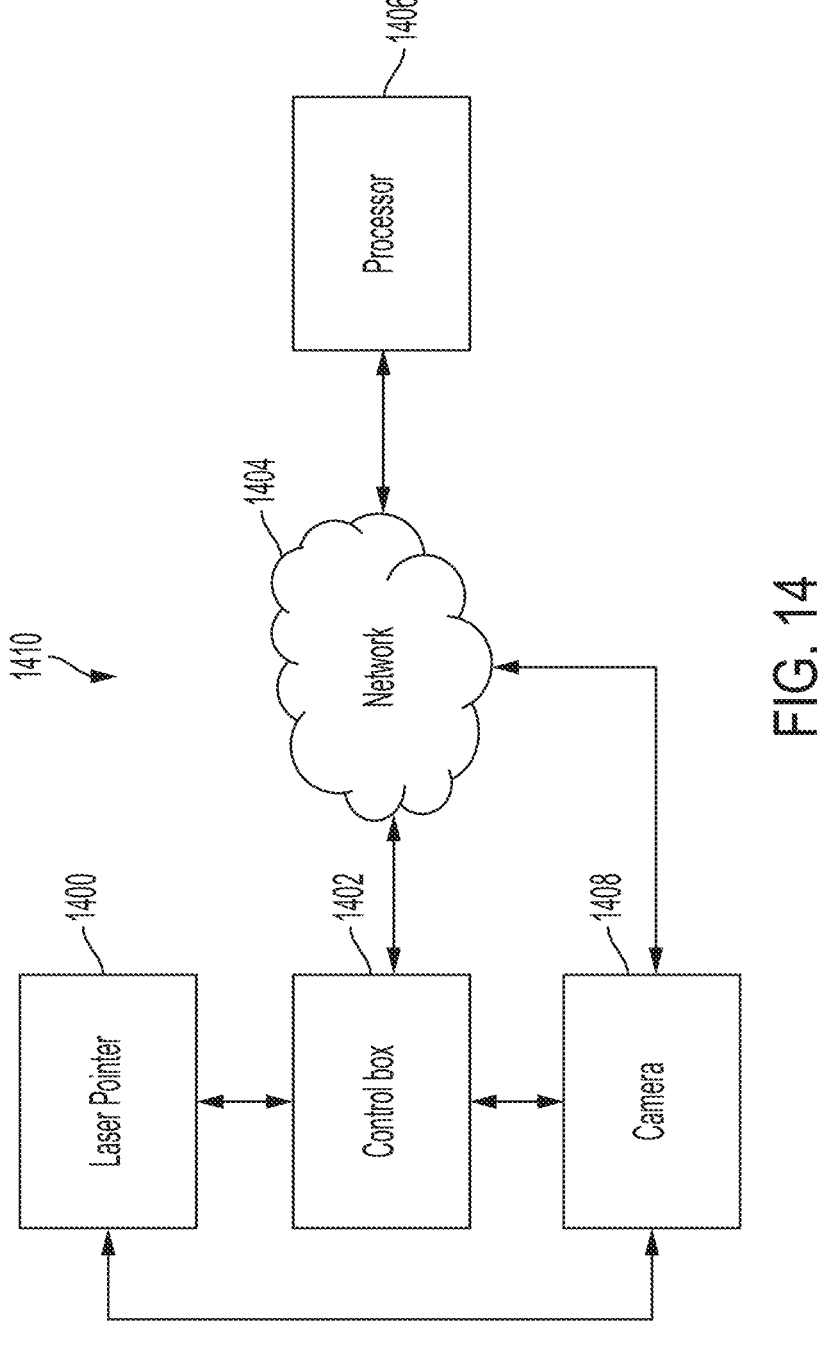
FIG. 14 depicts a diagram of a remote viewing system in accordance with some embodiments of the disclosure.

FIG. 14 depicts a diagram of a remote viewing system in accordance with some embodiments of the disclosure. Remote viewing system 1410 is shown. In the example shown, laser pointer 1400 has inputs and outputs to control box 1402, which is connected to network 1404. Network 1404 is also connected to processor 1406 and camera 1408. These connections among items 1400, 1402, 1404, 1406, and 1408 may permit one or two-way control and/or communication, and as such each of these items may be referred to as being communicably coupled to one or more of the others, according to some embodiments.

In some embodiments, laser pointer 1400 is switched on and off via control box 1402. In some embodiments, control box 1402 consists of a Raspberry PI 3 or other processor, a SD card with control software or other memory storage with software, a relay, a power supply, and/or a housing. In some embodiments, control box 1402 is connected via cable to camera 1408. In some embodiments, laser 1400 is connected to camera 1408. For example, laser 1400 and camera 1408 may be connected by a cable, such as an RJ45 cable.

In some embodiments, the Raspberry PI or other processor runs software that turns laser 1400 on or off. For example, the control software receives MQ Telemetry Transport (MQTT) commands and, based on those commands, enables and/or disables a relay. The relay is a separate component from the Raspberry PI and controls the power of laser 1400, in some instances. For example, if the general purpose output of the Raspberry PI has a voltage output, the relay closes, and the laser is supplied with power, thus lighting up.

Control software run by control box 1402 may receive commands from processor 1406. Processor 1406 may run software that enables remote viewing system 1410. In some embodiments, these commands are based on MQTT protocol and are initially triggered by a remote viewer who can enable or disable laser 1400. Based on these MQTT commands, the control software enables and/or disables a relay that turns the laser in the camera on or off.

In some embodiments, the control software comprises internet of things ("IoT") software. In some embodiments, the control software is used to control motorized screws in a laser mount used to mount laser 1400 in order to calibrate laser 1400's position. In some embodiments, each of the vertical and horizontal alignment screws is motorized, stepped, or otherwise configured for automatic and/or remote control.

In some embodiments, remote viewing system 1410 shown in FIG. 14 allows a viewer to remotely control a camera and laser. For example, a viewer can remotely tilt and pan a camera which has a laser mounted to it in a specific configuration, which allows the viewer to point the laser at desired objects. In some embodiments, remote viewing system 1410 is used in an operating room to allow experts or surgeon trainers to join a case happening anywhere in the world by using a web browser. The system allows a remote viewer to point out something directly on a patient's body or within the operating room without the requirement of using a second screen and/or showing a marked-up screenshot of the operation.

In some embodiments, the expert directly talks to the surgeon or nurse without interrupting surgery flow, or chats to the whole team at once when desired. The system may use high fidelity audio to enhance clear communication. Collaboration between surgical teams, industry representatives, and industry experts may be improved. Camera 1408 may display rich surgical video. Rich surgical video may be combined with device and implant data, imaging data, emergency medical record data, vitals data or any other data that is transported via network 1404 to the remote viewer's processor 1406, enabling a high fidelity surgical record to reach the remote viewer.

In some embodiments, system 1410 is used with one or more video sources in the operating room. For example, video sources may include a picture archive and communication system ("PACS") personal computer ("PC")/digital imaging and communications in medicine ("DICOM") VIEWER, endoscopy/arthroscopy, surgical light camera, vital signs, camera incision site, operating room scene camera, guidance system, or back table camera.

In some embodiments, the system is used with one or more of the following: enhanced time stamped markers and recording that make post-op case reviews and debriefing simple and meaningful; pan tilt and zoom control of cameras for the remote participant; telestration control; browser based Web Real-Time Communications (WebRTC) application, Health Insurance Portability and Accountability Act (HIPAA) compliant cloud-based setup including Firewalls and regular security updates, TLS/AES (transport layer security/advanced encryption standard) based setup; encryption of data in transit and at rest; 360° view of the operating room and surgical field for the remote viewer; and/or bidirectional point-to-point audio and video communication including echo cancelling. Telestration control comprises drawing and annotating photos and video. For example, figures may be circled or highlighted; arrows may be drawn.

Figure 15:
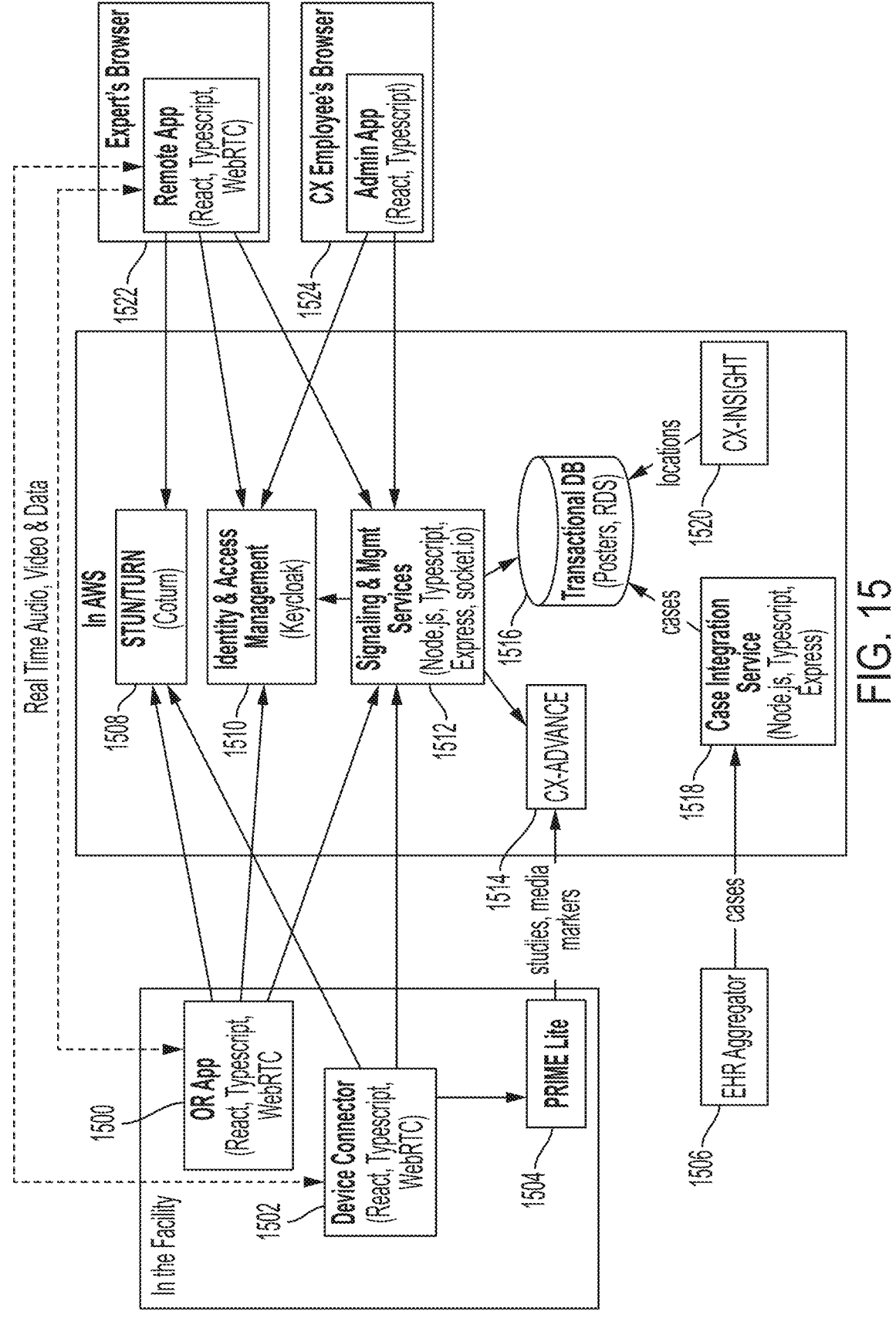
FIG. 15 depicts a diagram of the architecture of a remote viewing system in accordance with some embodiments of the disclosure.

FIG. 15 depicts a block diagram of the architecture of a remote viewing system in accordance with some embodiments of the disclosure. As shown, various software or hardware blocks within the operating room or facility (1500, 1502, 1504) are connected (e.g., communicably coupled) to various software or hardware blocks stored on one or more servers (i.e. "in the cloud") (1508, 1510, 1512, 1514, 1516, 1518, 1520), a remote viewer's computer (1522), and a computer (1524) of an administrator of the remote viewing system. The arrows depicted between the various blocks indicate possible directions of data flow, but any or all of such connections may permit or involve bidirectional data flow and communication in some embodiments. The blocks depicted may comprise any of a processor, a memory, and/or a database, according to some embodiments.

In some embodiments, software or hardware block 1508, Session Traversal Utilities for Network Address Translators/ Traversal Using Relays around Network Address Translators (STUN/TURN), provides a service from a server or cloud provider such as AMAZON WEB SERVICES ("AWS")® that initiates the video connection of the remote viewing system. It may comprise applications that initialize protocols or otherwise enable the video stream to work.

In some embodiments, identity and access management block 1510 provides security to the remote viewing system. For example, it may run credential checks to ensure that a remote viewer is approved before allowing the remote viewer access to certain media. It may request and process identity information such as biometrics or user log-ins.

CX Advance block 1514 represents video and photo storage for the remote viewing system. For example, block 1514 may comprise computer memory to store video or photographic media of operations in the operating room. Block 1514 may comprise a database.

In some embodiments, transactional database 1516 stores information regarding patient data such as case identification information, patient names, or patient medical history. Transactional database 1516 may also store identification information that allows media stored in CX Advance block 1514 to be linked to a specific patient, for example by using hashes.

Case integration service block 1518 may be used to receive information from a hospital's electronic health records system. For example, a hospital's existing electronic health records systems may not be compatible with a standard database such as database 1516. In some embodiments, case integration service block 1518 acts as a mediator layer that integrates the electronic health records data into a format that database 1516 can utilize, and/or vice versa. For example, case identification information and patient identification information may be transferred from electronic health record ("EHR") aggregator 1506 to case integration service block 1518 and then stored in database 1516. In some embodiments, EHR aggregator 1506 comprises a system located inside or outside of a hospital that stores and aggregates electronic health records information related to patients.

In some embodiments, CX-INSIGHT block 1520 is used to provide location information related to a hospital. For example, CX-INSIGHT block 1520 may be used to provide a location hierarchy of the identification information for the facility, the hospital, the department, and/or the specific operating room. CX-INSIGHT block 1520 may also provide various other functionalities such as patient report generating and report and/or data searching. Block 1520 may comprise computer memory, a database, and/or a processor.

Remote app block 1522 comprises an application for a remote viewer to view cases, view current operations in an operating room, and provide feedback. The application enables a remote viewer to generate telestrations (e.g. dynamic or live annotations of video or photo media), view and control multiple (e.g., up to eight) video streams in the operating room, control the laser, and perform the functionalities mentioned above. In various embodiments, the remote viewer is an operating room expert or a sales representative. The remote viewer may also be a trainee who is being trained by the person(s) in the operating room, for example, a trainee surgeon who views an expert surgeon perform a demonstration in the operating room.

Admin application 1524 may be used by an administrator, for example an administrator of the remote viewing system, to perform administrative functions regarding the remote viewing system. For example, admin application 1524 is used to define which remote viewers are allowed access to which cases. For example, admin application 1524 can be used to allow all remote viewers from a specific consulting company to have access to all cases from a specific department of a specific hospital due to an existing consulting relationship.

Operating room ("OR") Application 1500 is an application in the operating room that enables an interface and video and/or media associated with the remote viewing system to be displayed in the operating room. For example, OR Application 1500 provides an interface for nurses and/or doctors and/or other healthcare professionals to log in to a case and allow an expert to join the operation remotely. OR application 1500 may generate a video feed of the remote expert. OR application 1500 may provide an interface such as the one shown in FIG. 19. Device connecter 1502 connects streams and media from recording devices in the operating room to other computers, applications, or memories. PRIME LITE 1504 creates a snapshot or saves a video to a local computer in the operating room. In some embodiments, PRIME LITE 1504 comprises a software service application. PRIME LITE 1504 may be installed on a machine in the operating room.

In some embodiments, when a remote viewer comments on a case before or after an operating room operation associated with the case, the comment is created in remote app 1522. The comment then travels to signaling and management block 1512 before being stored in CX-Advance 1514.

In some embodiments, when a remote viewer comments on a case during an operation associated with the case, the comment travels from remote app 1522 to device connector 1502 and then to PRIME LITE 1504. For example, the remote viewer may enter a comment via his/her browser. PRIME LITE 1504 creates a snapshot or video containing the comment and then uploads the snapshot or video to the cloud. For example, the media is saved to CX-Advance 1514. A comment may be saved to a snapshot taken during the operation via one of the multiple (e.g., eight or more) video streams. A video of the operation may be saved with the comment saved as a marker to the video. These comments can be retrieved and reviewed after the operation by others viewing the case media. Device connector 1502 and remote app 1522 may be connected via a peer to peer connection. In some embodiments, device connector 1502 and remote app 1522 are not directly connected. In such embodiments, a comment travels from remote app 1522 to signaling and management services block 1512 before reaching device connector 1502.

Figure 16:
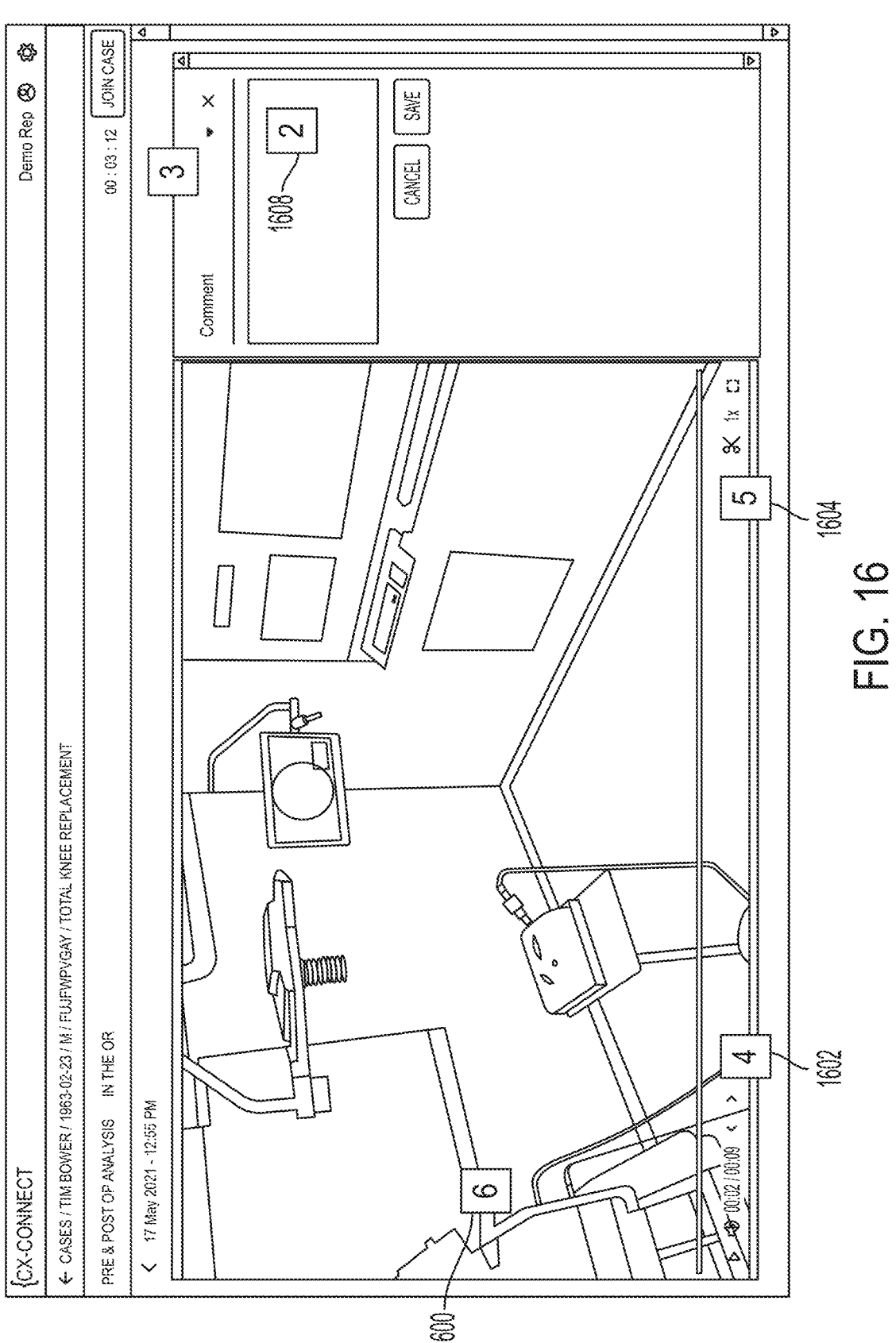
FIG. 16 depicts a user interface of a remote viewing system for review before or after an ongoing case in accordance with some embodiments of the disclosure.

FIG. 16 depicts a user interface of a remote viewing system for review before or after an ongoing case in accordance with some embodiments of the disclosure. Comment field 1608 allows a reviewer to add comments to the case or edit existing comments. Playback controls 1602 allow a reviewer to configure volume, pause and playback the video, or review the video in frame steps. Icons 1604 enable a reviewer to edit the video, change the playback state or view the media in full screen. For example, a reviewer can click the scissors icon and click on a slider in the video display to define the start of a portion of the video the reviewer wishes to remove. The reviewer can then click on a right slider to define the end of a portion of the video the reviewer wishes to remove, and then click the check icon to execute the edit. The reviewer may cut different parts of the video using various user interface icons, toolboxes, or menus.

In some embodiments, by clicking on arrow 1600, the viewer can switch to a view where all event markers are displayed, where an event marker indicates a comment written by a reviewer at a specific timestamp in the video. An example of such a view with event markers is shown in FIG. 17.

Figure 17:
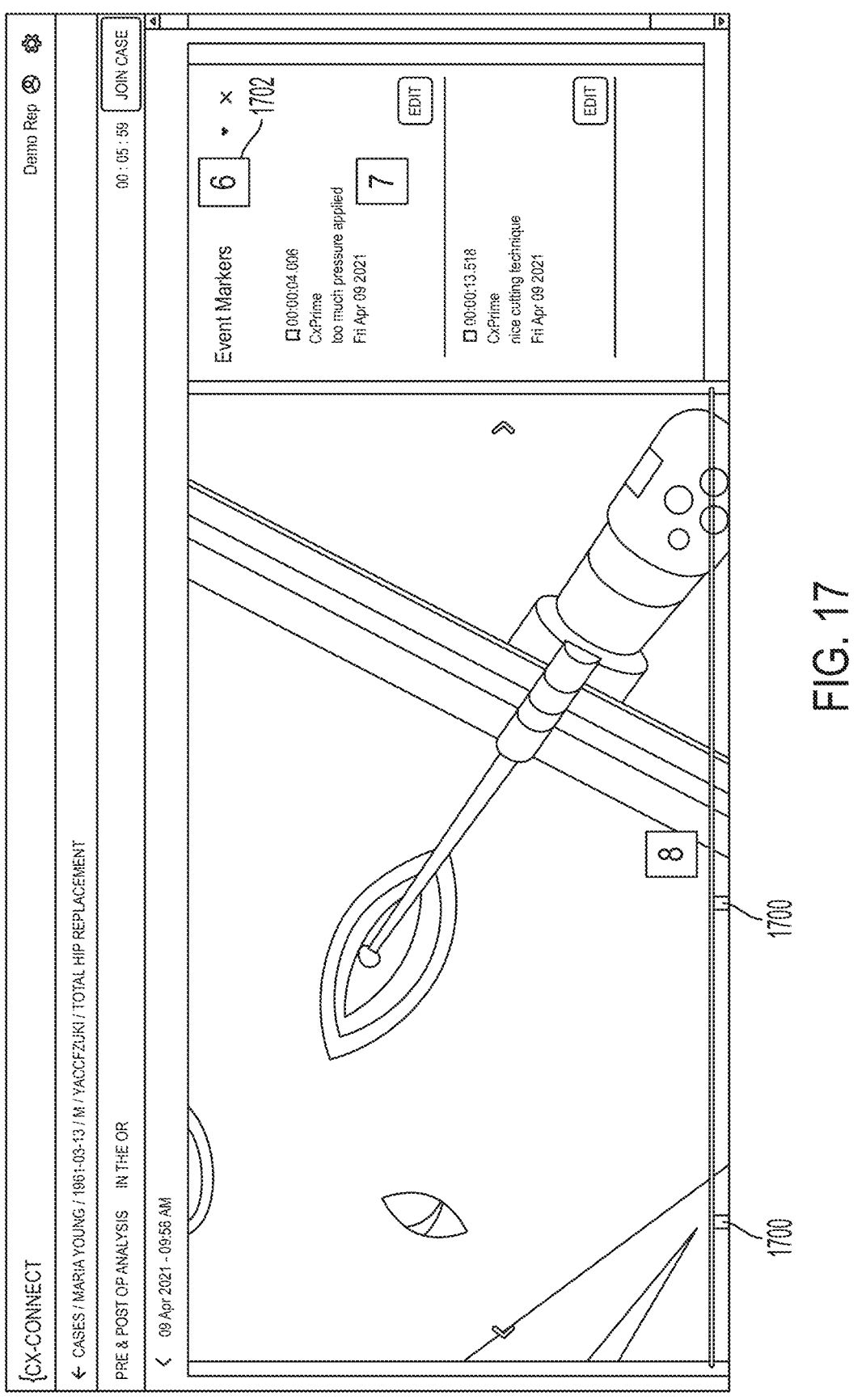
FIG. 17 depicts a user interface of a remote viewing system for review before or after an ongoing case in accordance with some embodiments of the disclosure.

FIG. 17 depicts a user interface of a remote viewing system for review before or after an ongoing case (e.g., an operation or operating room procedure) in accordance with some embodiments of the disclosure. Timestamp flags 1700 indicate timestamps in the video where a reviewer made comments on the video, creating an event marker. The flags are indicated in the figure by the blue squares in the time scroll of the video. A reviewer may click on a timestamp flag to jump to the timestamp in the video where the marker was created. Event marker display 1702 displays one or more event markers. An event marker comprises a comment made by a reviewer with a timestamp of when in the video that comment was created. Clicking on an event marker in event marker display 1702 may bring the reviewer to an associated moment in the video on display.

A reviewer may review case media such as videos or photos prior to an operation as preparation for the operation, e.g. a "pre-op review." For example, a reviewer may examine an X-RAY, CT scan, or other medical data to determine supplies needed by the operating room, preparation of the patient that is required, or otherwise determine actions the operating room should take. One or more reviewers including medical experts, nurses, doctors, or other professionals may review existing case media, add comments, and review each other's comments. A reviewer can conduct all review remotely without being physically present in the operating room, according to some embodiments of the present disclosure.

A reviewer may also review case media after an operation, e.g. "post-op review." The reviewer may look at all the images or video recordings and recorded comments and telestrations (drawings on the photos and/or videos). The reviewer can then use the media and comments to create operation reports. In some embodiments, the creation of the operation reports is automated or semi-automated based on the collected information.

An administrator of the remote viewing system 1410 from FIG. 4 can create authorized users for a given case and can add users to system 1410. A reviewer or operating room professional can search for a case in various ways such as entering a patient name, patient identification number or information, a case identification number, and/or an originally scheduled date. Cases can be found via customized searches. If a case does not exist, the administrator of the remote viewing system can create a new case manually and add information regarding the case to the system. An operating room professional such as a nurse can operate the remote viewing system from a display and user interface in the operating room comprising a processor, for example. The operating room professional can see what remote viewer is assigned to the case and can allow the remote viewer to join the call through the user interface, for example by clicking a button. The operating room professional can allow the remote viewer to join a case at any moment during the operation.

Figure 18:
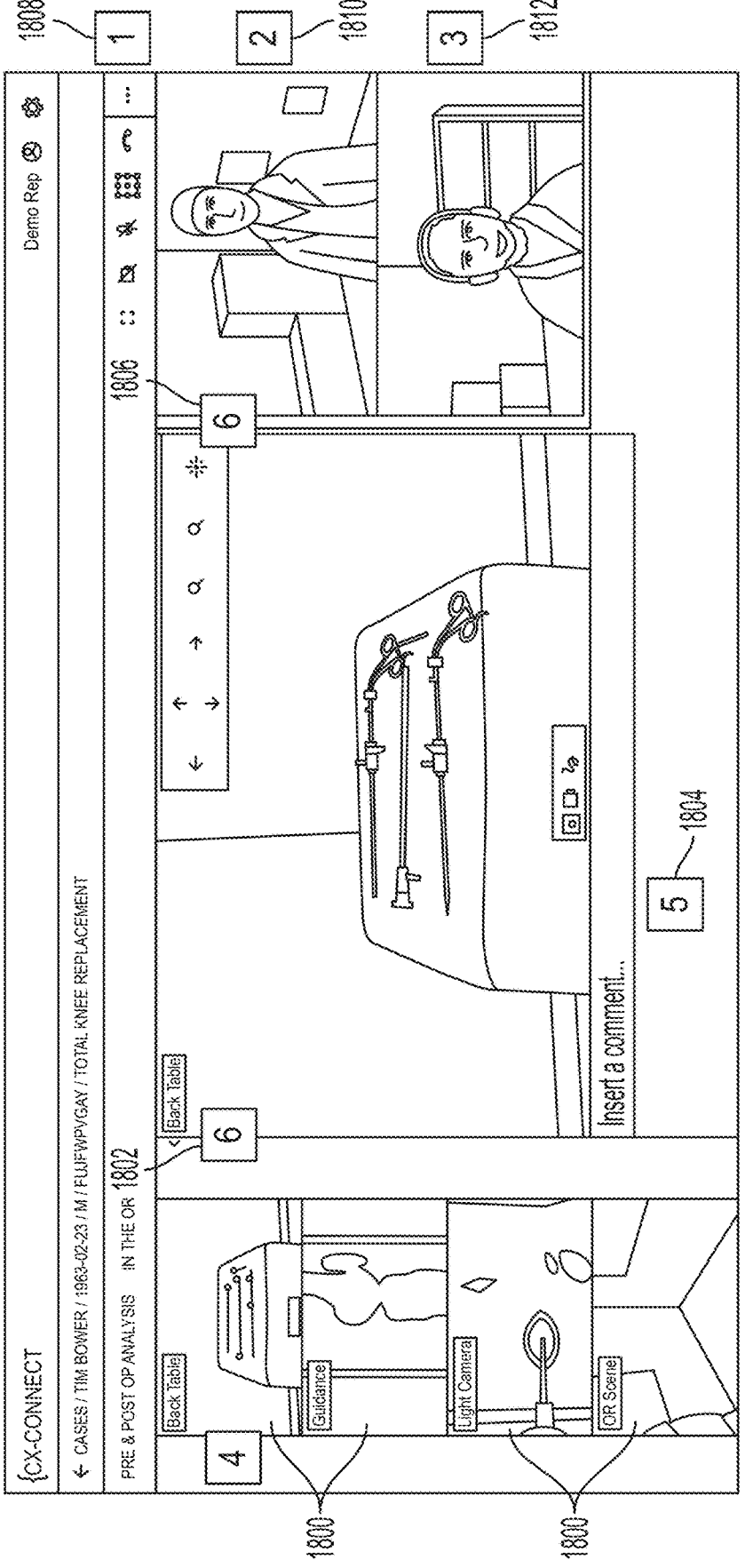
FIG. 18 depicts a user interface of a remote viewing system for review during an ongoing case in accordance with some embodiments of the disclosure.

FIG. 18 depicts a user interface of a remote viewing system for review during an ongoing case in accordance with some embodiments of the disclosure. FIG. 18 depicts what is displayed to a remote viewer. In the example shown, controls 1808 allow a remote viewer to mute and/or unmute the operating room's sound, mute and/or unmute the remote viewer's microphone, enter full-screen mode, share one of the remote viewer's screens or a specific application, and/or hang up the call.

In FIG. 18, a webcam view 1810 of the operating room is presented to the remote viewer. The remote viewer may also be presented with a webcam view 1812 of himself/herself. In some embodiments, webcam views 1810 and 1812 appear when the operating room and remote viewer respectively are unmuted, and the views disappear from the display when they are muted. Operating room views 1800 show various video feeds available from the operating room and/or remote feed. As shown, the video feeds show as thumbnails. A remote viewer may click on one to select it as the central main view 1802 to see it more clearly and to perform recording, telestration, or laser controls. Comment field 1804 allows a remote viewer to enter a comment and/or create a snapshot of the current video feed in main view along with the comment. For example, the remote viewer may type in a comment and click an "enter" button or otherwise cause the comment to be entered. During an ongoing case, this may create an event marker with a saved timestamp and comment in a recorded video file, for example. Arrow 1806 enables a remote viewer to adjust the size of the video thumbnails, including the operating room displays and the webcam displays, according to some embodiments.

A remote viewer can use telestration to draw on a live video feed. In some embodiments, the user interface comprises icons or controls that allow a remote viewer to adjust the width and color of a pen to draw with and allow a remote viewer to erase portions or all drawings, for example in "real time" or dynamically with respect to time, similar to telestration performed by sports broadcasters during live or replay sports video footage. The remote viewer can also save a screenshot of the image including the drawings. In some embodiments, the remote viewer can save drawings as an event marker in a video feed. The remote viewer can also engage in pointing mode and point at things in the live video feed using the mouse cursor. The remote viewer can also remotely manipulate a laser that is in the operating room (e.g., the laser discussed above) to point to things in the operating room. The laser manipulation may be through the same user interface discussed in FIG. 18. The remote viewer can speak directly to the operating room through a computer microphone. The remote viewer also has controls over the operating room cameras. For example, the remote viewer can move camera into desired positions.

The comments and telestrations are recorded while the video is ongoing, according to some embodiments. For example, the recording is in real-time. Receiving comments from a remote viewer can be beneficial because the number of people in the operating room may in some cases be limited. Additionally, a remote viewer can note aspects to improve upon for the next operation, which can be preferred over a surgeon halting mid-operation to take notes.

In some embodiments, the operating room sees a display that is similar to FIG. 18, including a view of one of the cameras in the operating room (e.g. of a patient's incision), a webcam of the operating room, and/or a webcam of the remote viewer.

Figure 19:
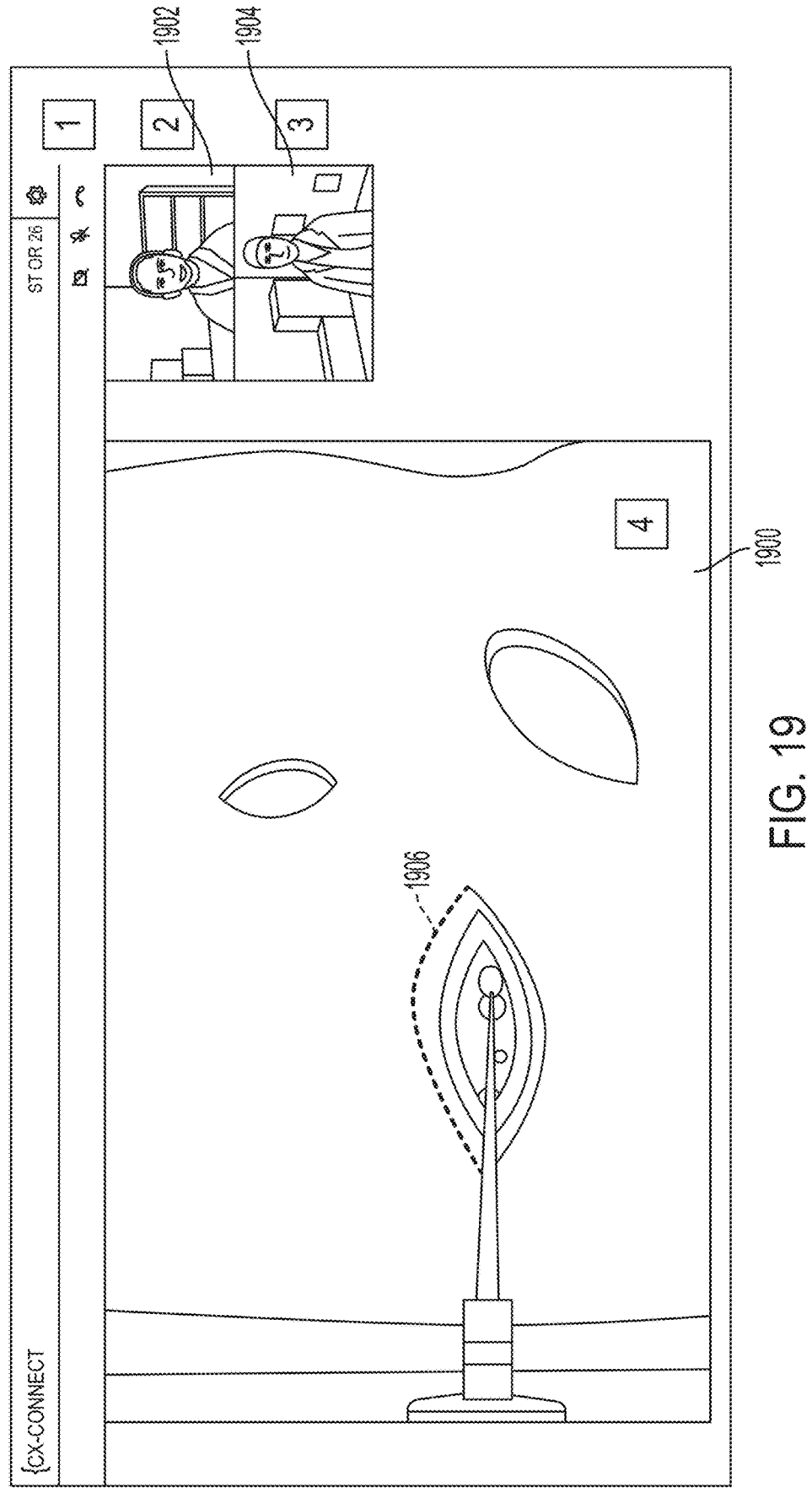
FIG. 19 depicts a user interface of a remote viewing system for review during an ongoing case in accordance with some embodiments of the disclosure.

FIG. 19 depicts a user interface of a remote viewing system for review during an ongoing case in accordance with some embodiments of the disclosure. FIG. 19 depicts what is displayed to an operating room. View 1900 shows an image that the remote viewer can draw and annotate, with the drawings and annotations visible to the operating room. As shown, view 1900 shows an incision site of the patient. The annotation screen may be focused on an operation site, tool selection area, or any other part of the operating room where the remote reviewer wishes to give input. View 1902 shows a webcam view of the remote viewer. View 1904 shows a webcam view of an operating room professional. The different views shown in FIG. 18 and FIG. 19 can be adjusted in size and in their layout on the screen. A user can also adjust settings to turn off one or both of the webcam views. View 1900 shows an annotation 1906 that has been added to the shared display by one or more of remote viewer and/or operating room professional.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A system, comprising:
a laser mount configured to fixedly couple a laser pointer to a camera,
a control device communicably coupled to the laser mount;
a network communicably coupled to the control device; and
a processor communicably coupled to the network, wherein the laser mount comprises:
a first layer,
a second layer comprising a first end and a second end, a connection between the first layer and the first end forming a spring-tensioned hinge, such that deflection of the second end about the connection imparts a spring tension to the second layer, the second end being spaced apart from the first layer, and the second layer being configured to fixedly couple the laser pointer,
a first adjustment screw configured to vertically couple the first layer and the second end and to adjust a vertical spring tension between the first layer and the second layer, and
a second adjustment screw configured to horizontally couple the first layer and the second end and to adjust a horizontal spring tension between the first layer and the second layer.

2. The system of claim 1, wherein the control device is configured to switch between an on status and an off status of the laser pointer.

3. The system of claim 2, further comprising a relay communicably coupled to the control device and configured to control power of the laser pointer, wherein the control device is further configured to:
receive a command from the processor via the network, and
based on the command, enable or disable the relay to control the power of the laser pointer.

4. The system of claim 1, wherein the control device is further communicably coupled to the camera and configured to control the camera to view a position, wherein a laser beam emitted from the laser pointer points to the position when the camera is viewing the position.

5. The system of claim 4, wherein the control device is further configured to:
receive a command from the processor via the network; and
based on the command, control an action of the camera to view the position, wherein the action comprises at least one of panning, tilting, or zooming.

6. The system of claim 1, wherein the laser pointer is further communicably coupled to the camera, the control device is further communicably coupled to the camera, the first adjustment screw and the second adjustment screw are automated screws, and the control device is configured to:
actuate at least one of the first adjustment screw or the second adjustment screw to calibrate a position of a laser beam emitted from the laser pointer in a view of the camera.

7. The system of claim 1, wherein the network is further communicably coupled to the camera and configured to transmit audiovisual data between the camera and the processor.

8. The system of claim 7, wherein the processor is configured to perform at least one of generating telestration of the audiovisual data, editing the audiovisual data, presenting the audiovisual data on an interface, encrypting the audiovisual data, or storing the audiovisual data.

9. The system of claim 1, further comprising a plurality of audiovisual source devices communicatively coupled to the network and to transmit audiovisual data to the processor, wherein the plurality of audiovisual source devices comprises at least one of a picture archive and communication system, a personal computer, a digital imaging and communications in medicine viewer, an endoscopy, an arthroscopy, a surgical light camera, a vital sign, a camera incision site, an operating room scene camera, a guidance system, or a back table camera.

\* \* \* \* \*